United States Patent
Hasegawa et al.

(10) Patent No.: US 9,781,719 B2
(45) Date of Patent: Oct. 3, 2017

(54) MULTICHANNEL WIRELESS COMMUNICATION SYSTEM, BASE STATION, AND METHOD FOR USING CHANNEL

(71) Applicant: HITACHI KOKUSAI ELECTRIC INC., Chiyoda-ku, Tokyo (JP)

(72) Inventors: Keigo Hasegawa, Kodaira (JP); Keat Beng Toh, Kodaira (JP); Masayuki Takekawa, Kodaira (JP); Kei Yanagisawa, Kodaira (JP); Madoka Tanaka, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 14/430,578

(22) PCT Filed: Aug. 29, 2013

(86) PCT No.: PCT/JP2013/073171
§ 371 (c)(1),
(2) Date: Mar. 24, 2015

(87) PCT Pub. No.: WO2014/065002
PCT Pub. Date: May 1, 2014

(65) Prior Publication Data
US 2015/0257152 A1    Sep. 10, 2015

(30) Foreign Application Priority Data

Oct. 26, 2012  (JP) .................................. 2012-237249
Dec. 27, 2012  (JP) .................................. 2012-284747

(51) Int. Cl.
*H04W 16/14*    (2009.01)
*H04W 72/04*    (2009.01)
(Continued)

(52) U.S. Cl.
CPC ....... *H04W 72/0453* (2013.01); *H04W 16/14* (2013.01); *H04W 72/1215* (2013.01); *H04W 88/08* (2013.01)

(58) Field of Classification Search
None
See application file for complete search history.

(56) References Cited

U.S. PATENT DOCUMENTS

2008/0259859 A1*  10/2008  Cordeiro ............... H04W 72/06
                                                       370/329
2011/0038262 A1*  2/2011   Nabetani ............... H04L 1/1607
                                                       370/232
(Continued)

FOREIGN PATENT DOCUMENTS

JP    2006313993 A    11/2006
JP    2007088940 A    4/2007
(Continued)

OTHER PUBLICATIONS

Fujji, Koji, "Cognitive radio: Core technology of using white space to eliminate the waste of wave use", [online], RIC TELECOM, [retrieved on Jun. 9, 2011], retrieved from http//businessnetwork.jp/tabid/65/artid/110/page/1/Default.aspx, (with English translation).

(Continued)

*Primary Examiner* — Hassan Kizou
*Assistant Examiner* — Hashim Bhatti
(74) *Attorney, Agent, or Firm* — Harness, Dickey & Pierce, P.L.C.

(57) ABSTRACT

The present invention introduces a multichannel MAC into a white-space-using system. A base station and a terminal station are each configured from a plurality of wireless communication units and centralized control units thereof. Each of the wireless communication units wirelessly transmits/receives for one channel. The base station operates one (Continued)

or more channels according to white-space-channel status, and is assigned to a terminal station. When operating a plurality of channels, it is possible to select a redundancy mode for assigning data by duplicating the terminal-station data in a plurality of channels, and a high-speed mode for dividing the data and distributing the data among the plurality of channels.

9 Claims, 16 Drawing Sheets

(51) Int. Cl.
*H04W 72/12* (2009.01)
*H04W 88/08* (2009.01)

(56) References Cited

U.S. PATENT DOCUMENTS

| | | | | |
|---|---|---|---|---|
| 2011/0039593 | A1* | 2/2011 | Lee | H04L 1/188 455/515 |
| 2011/0069638 | A1* | 3/2011 | Ishizu | H04L 5/0032 370/254 |
| 2011/0116487 | A1* | 5/2011 | Grandhi | H04W 72/1278 370/338 |
| 2012/0026941 | A1* | 2/2012 | Ahmad | H04W 48/16 370/328 |
| 2012/0094681 | A1 | 4/2012 | Freda et al. | |
| 2014/0079016 | A1* | 3/2014 | Dai | H04L 5/0041 370/330 |

FOREIGN PATENT DOCUMENTS

| | | |
|---|---|---|
| JP | 2009-509382 | 3/2009 |
| JP | 2009-159406 | 7/2009 |
| JP | 2011071625 A | 4/2011 |
| JP | 2013-511217 | 3/2013 |
| JP | 2013-520938 | 6/2013 |
| JP | 2014-502453 | 1/2014 |
| WO | WO-2011155256 A1 | 12/2011 |
| WO | WO 2012/064502 | 5/2014 |

OTHER PUBLICATIONS

IEEE Standards Association, "Part 22: Cognitive Wireless RAN Medium Access Control (MAC) and Physical Layer (PHY) Specifications: Policies and Procedures for Operation in the TV Bands", IEEE Std 802.22-2011, Institute of Electrical and Electronics Engineers, Inc., New York, NY, Jul. 1, 2011.
International Search Report (in Japanese with English Translation) for PCT/JP2013/073171, mailed Nov. 26, 2013; ISA/JP.
Extended European Search Report issued Jul. 20, 2016 in corresponding European application No. 13849273.1.

* cited by examiner

CHANNEL UNIT CHANNEL ALLOCATION OPERATIONS (BS)

MULTICHANNEL WIRELESS COMMUNICATION SYSTEM, BASE STATION, AND METHOD FOR USING CHANNEL

CROSS REFERENCE TO RELATED APPLICATIONS

This application is a U.S. National Phase Application under 35 U.S.C. 371 of International Application No. PCT/JP2013/073171 filed on Aug. 29, 2013 and published in Japanese as WO 2014/065002 A1 on May 1, 2014. This application is based on and claims the benefit of priority from Japanese Applications No. 2012-237249 filed on Oct. 26, 2012 and No. 2012-284747 filed Dec. 27, 2012. The entire disclosures of all of the above applications are incorporated herein by reference.

TECHNICAL FIELD

The present invention relates to a multi-channel wireless communication system in which one base station uses a plurality of channels to configure a cell for accommodating a wireless communication terminal.

BACKGROUND ART

Generally, licenses of frequencies are managed by the government and only licensed persons can use the frequencies in specific places and time under strict management. Demands for the wireless frequencies as finite resource are increasing and a lack of allocatable frequencies is problematic around the world.

Therefore, in recent years, a method has been studied for using a frequency band (white space) which is not used spatially and temporally irrespective of being already assigned as a using method of new frequency in order to solve the problem of exhausted frequencies. A cognitive wireless technique is used such that while effects on the use of frequencies in existing systems of the licensed users (which will be denoted as "primary users" below) are sufficiently avoided, non-licensed users (which will be denoted as "secondary users" below) flexibly use a white space.

In a method for correctly recognizing which frequency channel is in a white space, a database (DB) server for managing a list of white space channels (WSCH) and providing positional information, antenna height or antenna directivity, gain and the like is installed over the Internet such that each wireless station can access the same directly or via a proxy server. Each wireless station acquires its own WSCH list (list of available frequency channels), maximum transmittable power corresponding to each WSCH, available period, and the like from the DB server.

In other method, each wireless station senses a radio wave used by a primary system with spectrum sensing, and when confirming the absence of a radio wave, enables a frequency channel of the primary system to be used as a white space, and when sensing the presence thereof, excludes the channel from its WSCH list.

There is known IEEE 802.22 (see Non-Patent Literature 2) as an international standard-setting organization of wireless communication systems using a white space. FIG. 1 illustrates a system structure of the IEEE 802.22-2011 (simply called 802.22 below). The system is such that one base station (BS) and one or more pieces of customer premises equipment (CPE) configure a cell, and avoids interference on the primary system by an access to a DB server 6 via the Internet 5 thereby to realize secondary use.

The management or setting of a channel operated by the 802.22 system is controlled by a spectrum manager (SM) in the base station, and the SM sets priorities on the WSCH to select one operating channel for use based on a DB access result (WSCH list for BS) acquired by a management information base (MIB), a spectrum sensing result and positional information.

Exemplary operations of the 802.22 system will be described below with reference to FIG. 2.

When being powered on and activated, a BS acquires a WSCH list by an access to the DB server 6 and spectrum sensing, and selects one channel as operating channel from the WSCH list thereby to start operation. That is, a wireless signal is exchanged at a frequency of the operating channel.

When starting operation, the BS broadcasts control information to a service area (cell). The 802.22 employs a structure in which 16 frames are assumed as one superframe as illustrated in FIG. 3, and the BS periodically transmits SCH (Superframe Control Header) as superframe control information, FCH (Frame Control Header) as frame control information, DS-MAP (Downstream Map) or US-MAP (Upstream Map) to manage and control the cell.

When being powered on, CPE confirms a channel at which a primary system is absent by sensing, and then tries to receive a BS signal (SCH) while switching frequencies in a BS search processing. (Sensing may be included in the BS search processing or sensing may be performed on the channel after a BS signal (SCH) is sensed.)

When successfully receiving SCH from the BS, and additionally receiving the frame control information such as FCH, DS-MAP or US-MAP, the CPE can correctly recognize the structure in the frame thereby to perform a synchronization processing such as adjustment of signal transmission/reception timing or transmission power between BS and CPE, or procedures such as registration, authentication and service allocation of CPE terminal information (ID, positional information, maximum transmission power). At this time, CPE presents its positional information, thereby asking BS whether the incumbent operating CH is available as its WSCH.

When connection between the BS and the CPE is established, data communication is performed under control of the BS. The 802.22 employs OFDMA (Orthogonal Frequency Division Multiple Access) for multiple access system and TDD (Time Division Duplex) for complex communication system.

While the BS performs data communication, it updates the WSCH list by DB access or sensing periodically or as needed, and at this time, when the BS determines that the operating channel is not available, a channel switch processing is performed to switch the channels in the entire cell. When only specific CPE cannot use an incumbent operating channel, only the CPE is disconnected, and a determination to continue the operation at the channel may be made depending on a BS operation policy.

While the CPE performs data communication, it performs sensing periodically or in response to an instruction from BS, and when CPE senses a primary system at the operating channel, it notifies the information to the BS. The BS performs channel switching with the notification as a trigger. When the CPE cannot receive a signal from the BS over a certain period of time due to failed reception of a control message such as channel switch request from the BS, the CPE achieves the channel switching in the BS search processing.

CITATION LIST

Patent Literature

Patent Literature 1: US Patent Application No. 2011/0039593

Non Patent Literature

Non-Patent Literature 1: Kouji FUJII, "Cognitive radio: Core technique for utilizing white space in order to eliminate waste of radio waves", [online], RIC TELECOM, [searched on Jun. 9, 2011], the Internet <URL: http://businessnetwork.jp/tabid/65/artid/110/page/1/Default.aspx>

Non-Patent Literature 2: The Institute of Electrical and Electronics Engineers (IEEE) Computer Society, "IEEE Std 802.22-2011 Part 22: Cognitive Wireless RAN Medium Access Control (MAC) and Physical Layer (PHY) Specifications: Policies and Procedures for Operation in the TV Bands", (US), the IEEE standardization society, Jul. 27, 2011

SUMMARY OF INVENTION

Technical Problem

Non-Patent Literature 2 (IEEE 802.22-2011) was established with the aim of providing wireless broadband communication services to CPE. However, when many pieces of CPE are connected, a communication service cannot be provided with excellent quality. A revised 802.22 has been currently discussed with one aim of aggregating bit rates in consideration of future demands for communication services with wider bands.

However, the operating channel determination means in Non-Patent Literature 2 does not assume that a plurality of channels are used as operating channels. Therefore, if Non-Patent Literature 2 is simply extended, various unreasonable things are caused, which is problematic in terms of effective use of white space, provision of high-seed communication to users, low-cost construction of system, and the like.

The present invention has been made in order to solve the above problems, and it is an object thereof to enable WSCH to be dynamically used and to realize high-speed communication while effectively using a white space in a multichannel wireless communication system including a plurality of base stations (BS) in which cells for accommodating wireless communication terminals (CPE) are configured by use of a plurality of channels, respectively.

Solution to Problem

According to one aspect of the present invention, there is provided a multi-channel communication system including a base station including a plurality of wireless communication units and an intensive control unit, and one or more terminal stations each including a plurality of wireless communication units and an intensive control unit, wherein when a base station operates one or more channels depending on a situation of a white space channel and allocates them to the terminal stations thereby to operate a plurality of channels, communication is performed in a robust mode of duplicating and allocating data on the terminal stations to the channels, or a high-seed mode of dividing and allocating data.

According to another aspect of the present invention, the intensive control unit in the base station includes a channel addition means for allocating operating channels to the wireless communication units in the base station, a means for switching operating channels in the wireless communication units, a means for stopping operating channels in the wireless communication units, a means for making a channel allocation determination on the terminal stations, a means for performing a transmission data allocation processing and making a data transmission instruction to the wireless communication units, and a means for converging and organizing data received by the wireless communication units.

Further, the channel addition means in the intensive control unit includes a processing of selecting one wireless communication unit from among the wireless communication units which do not start to operate, a processing of making an operation start request to the wireless communication unit, a processing of notifying management information including a channel number and transmission power information operated by the wireless communication unit to the wireless communication unit, and a processing of receiving an operation preparation completed notification from the wireless communication unit.

Further, the means for switching operating channels in the intensive control unit includes a processing of determining a channel after being switched based on a list of white space channels, and a processing of instructing the wireless communication units to transmit a switch request message designating a channel after being switched, wherein the wireless communication unit includes a processing of broadcast- or unicast-transmitting to the plurality of or single terminal station, and a processing of notifying a channel switch completed notification to the intensive control unit.

The means for stopping operating channels in the intensive control unit includes a processing of determining whether to stop operating channels based on a list of white space channels, and a processing of instructing the wireless communication unit to transmit a stop request message, wherein the wireless communication unit includes a processing of broadcast- or unicast-transmitting to the plurality of or single terminal station, and a processing of notifying a stop completed notification to the intensive control unit.

The stop request transmits a stop request message or a channel after being switched in the channel switch request message as NULL.

The means for converging and organizing data in the intensive control unit includes a processing of selecting one item of normally-received data from among items of data received by the wireless communication units in a robust mode, and arranging an order of data, and a processing of arranging an order of data received by the wireless communication units in a high-speed mode.

The intensive control unit in the terminal station includes:

a channel addition means for making an operation start instruction to the wireless communication units in the terminal station, a means for switching operating channels in the wireless communication units, and a means for stopping operating channels in the wireless communication units; and a means for performing a transmission data allocation processing and making a data transmission instruction to the wireless communication units, and a means for converging and organizing data received by the wireless communication units.

The channel addition means for making an operation start instruction to the intensive control unit includes a processing of selecting one wireless communication unit from among the wireless communication units, a processing of making a base station search instruction to the wireless communication unit, a processing of receiving a base station detection notification when the wireless communication unit finds a base station, a processing of determining whether the base station is the same as a base station connected to other wireless communication unit in operation, a processing of making a connection processing continuation instruction to the wireless unit when the determination processing is true, and receiving a synchronization completed notification in the wireless communication unit, a processing of registering the start of connection in a new channel in the base station, and a processing of transmitting a base station mismatch notification to the wireless communication unit when the base station match determination processing is false, and continuously searching a base station.

The means for switching operating channels in the intensive control unit includes a processing of receiving a channel switch request reception notification from the base station in the wireless communication unit, a processing of permitting the wireless communication unit to switch a channel and making a switch instruction, and a processing of receiving a channel switch completed notification in the wireless communication unit.

The means for stopping operation in the intensive control unit includes a processing of receiving an operation stop request reception notification from the base station in the wireless communication unit, a processing of permitting the wireless communication unit to stop operation and making a stop instruction, and a processing of receiving an operation stop completed notification in the wireless communication unit.

The means for converging and organizing data in the intensive control unit includes a processing of selecting one item of normally-received data from among items of data received by the wireless communication units, and arranging an order of data in a robust mode, and a processing of arranging an order of data received by the wireless communication units in a high-speed mode.

Advantageous Effects of Invention

According to the present invention, it is possible to enable a plurality of frequency channels to be dynamically operated and to realize high-speed and robust communication without any interference on a primary system in a multi-channel wireless communication system using a white space.

DESCRIPTION OF EMBODIMENTS

Figure 1:
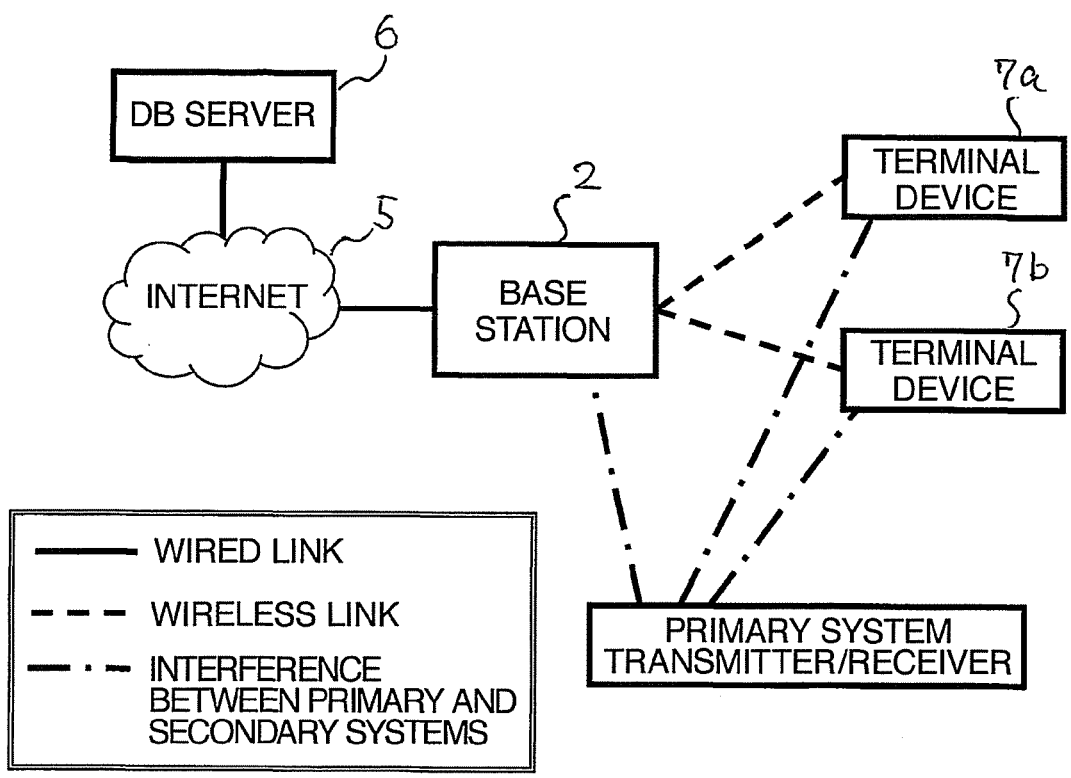
FIG. 1 is a configuration diagram of a multi-channel wireless communication system according to a conventional form and one embodiment of the present invention.
Figure 2:
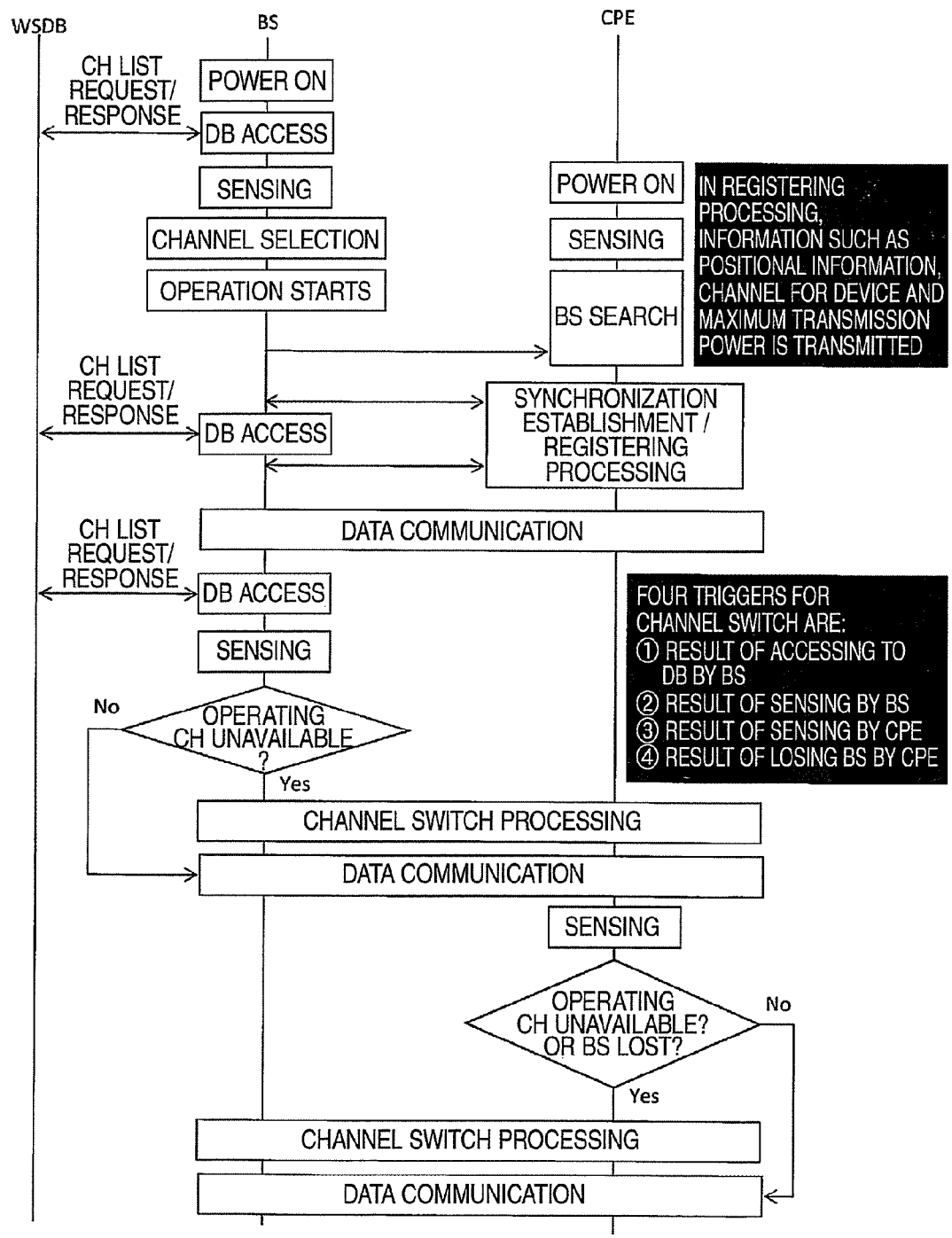
FIG. 2 is a flowchart of basic operation processings in the multi-channel wireless communication system according to a conventional form (802.22 system) and the embodiment of the present invention.

Embodiments according to the present invention will be described below with reference to the drawings.

The same reference numerals are denoted to the same parts as those in other diagrams in each diagram referred to in the following description.

Example 1

FIG. 1 illustrates an exemplary entire structure of a multi-channel wireless communication system according to Example 1. The multi-channel wireless communication system is assumed to be applied (revised) to the 802.22, and has the same basic structure as ever. However, BS 2 and CPE 7a, 7b have the different structures from conventional ones, such as simultaneous transmission/reception in a plurality of channels. CPE 7a and 7b are collectively called CPE 7.

Figure 4:
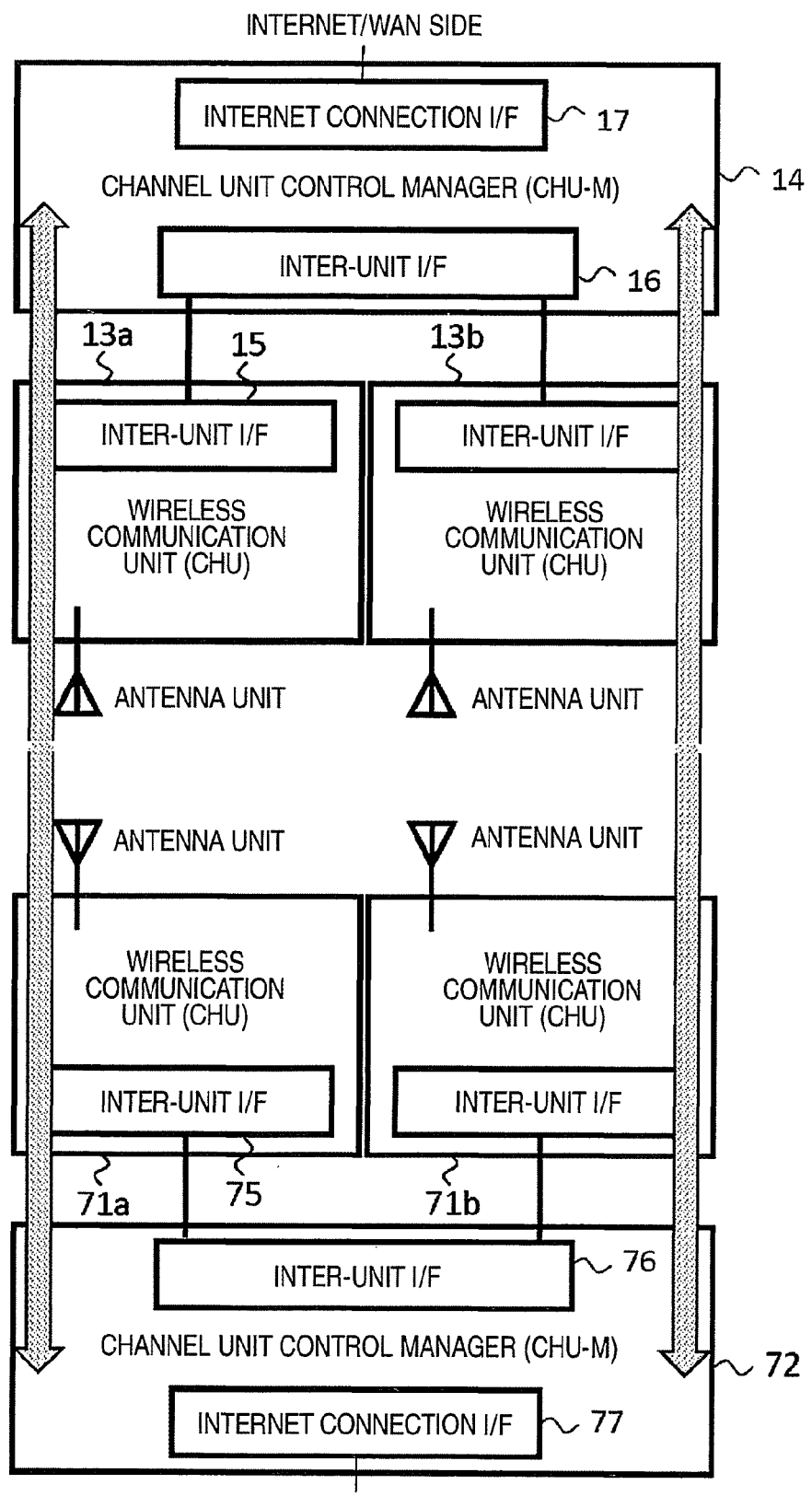
FIG. 4 is a schematic diagram illustrating communication between BS 2 and CPE 7 in a multi-channel wireless communication system according to Example 1.

FIG. 4 is a schematic diagram illustrating communication between BS 2 and CPE 7 in the multi-channel wireless communication system according to Example 1. BS 2 has a plurality of wireless communication units (BS-CHU) 13a, 13b, and a channel unit control manager (CHU-M) 14 for controlling the BS-CHUs. Inter-unit I/F 16 and 15 are provided between BS-CHU 13 and CHU-M 14 in order to connect them. CHU-M 14 also includes an Internet connection I/F 17 for connecting to the Internet (WAN).

BS-CHU 13 has a capability of transmitting and receiving wireless signals in one frequency channel with a predetermined bandwidth (of 5 MHz, for example) similar to the conventional 802.22-2011. A channel frequency used by each CHU is desirably variable (programmable). Since a frequency in a white space is wide-ranging, however, the band may be divided such that each CHU can vary a frequency channel in one divided band range. Each CHU 13 operates in synchronization with a timing of a physical layer (superframe, frame, TDD).-

Figure 5:
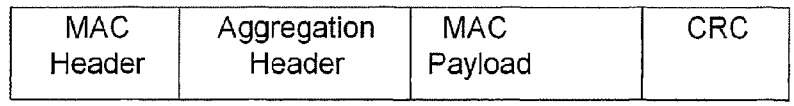
FIG. 5 is a format of MAC PDU used in the multi-channel wireless communication system according to the first to fourth examples.

CHU-M 14 manages allocation (distribution) of downstream data (data plane) from the Internet to CHU, and generates MAP information. It further buffers upstream data (data plane) from CPE, and makes order organization or selection. CHU-M 14 has a channel allocation manager (BS-CAM) 41 for allocating operating channels to individual BS-CHUs 13, and a CPE management unit 42 for In the present example, as illustrated in FIG. 5, MAC PDU communicated during multi-channel operation is always provided with Aggregation Header at a position corresponding to a sub-header. Aggregation Header is used to manage bundled data sequences and aggregation types, and is notified to the reception side in a format defined as in Table 1.

TABLE 1

| Syntax | Size | Notes |
| --- | --- | --- |
| Aggregation_Header_Format( ) { | | |
| Aggregation ID | 16 bits | Indicates the sequence management ID of the transmitted data during multi-channel operation. The value of Aggregation ID is from 0 to 8191. The Aggregation ID shall be incremented by one after each transmission and shall be reset to 0 after the maximum value (8191). |
| Aggregation Type | 8 bits | This field specifies the aggregation type of the transmission.<br>0x00: No aggregation.<br>0x01: Diversity mode.<br>0x02: Bulk transmission mode.<br>0x03-0xFF: Reserved. |
| } | | | vidual BS-CHUs 13, and a CPE management unit 42 for holding information on CPE connected to BS 2 and managing states of CPE (not illustrated).

The inter-unit I/F 15 and 16 are logical, and do not necessarily need to be with hardware.

The structure of CPE 7 is the same as BS 2 except its details, and has a plurality of CPE-CHUs 71.

CPE-CHU 71 requires lower transmission power than BS-CHU 13 in BS, and can be easily used as hardware for all bands.

CHU-M 72 has a channel allocation manager (CPE-CAM) 81 (not illustrated) for allocating operating channels to individual CPE-CHUs 71.

BS-CHU 13 or CPE-CHU 71 may be an entity on software capable of being handled as a unit in which a wireless processing is performed for one channel in the MAC layer processing. BS-CHU 13 or CPE-CHU 71 has specific CHUID (CHU-IDentification), respectively.

In Example 1, in terms of a pair of BS and CPE in a cell, CHUs are assumed to be connected in one-to-one basis. That is, one CHU is not connected to a plurality of CHUs at the same time. The number of channels used for communication between BS and CPE at the same time is limited within the smaller number of CHUs in either of BS or CPE.

The multi-channel data transmission systems include a robust mode of transmitting and receiving the same data in a plurality of (all of) pairs of connected CHUs, a dispersion mode of dividing and transmitting and receiving data to any pair, and an adaptive mode of adaptively selecting one of the two modes.

Figure 3:
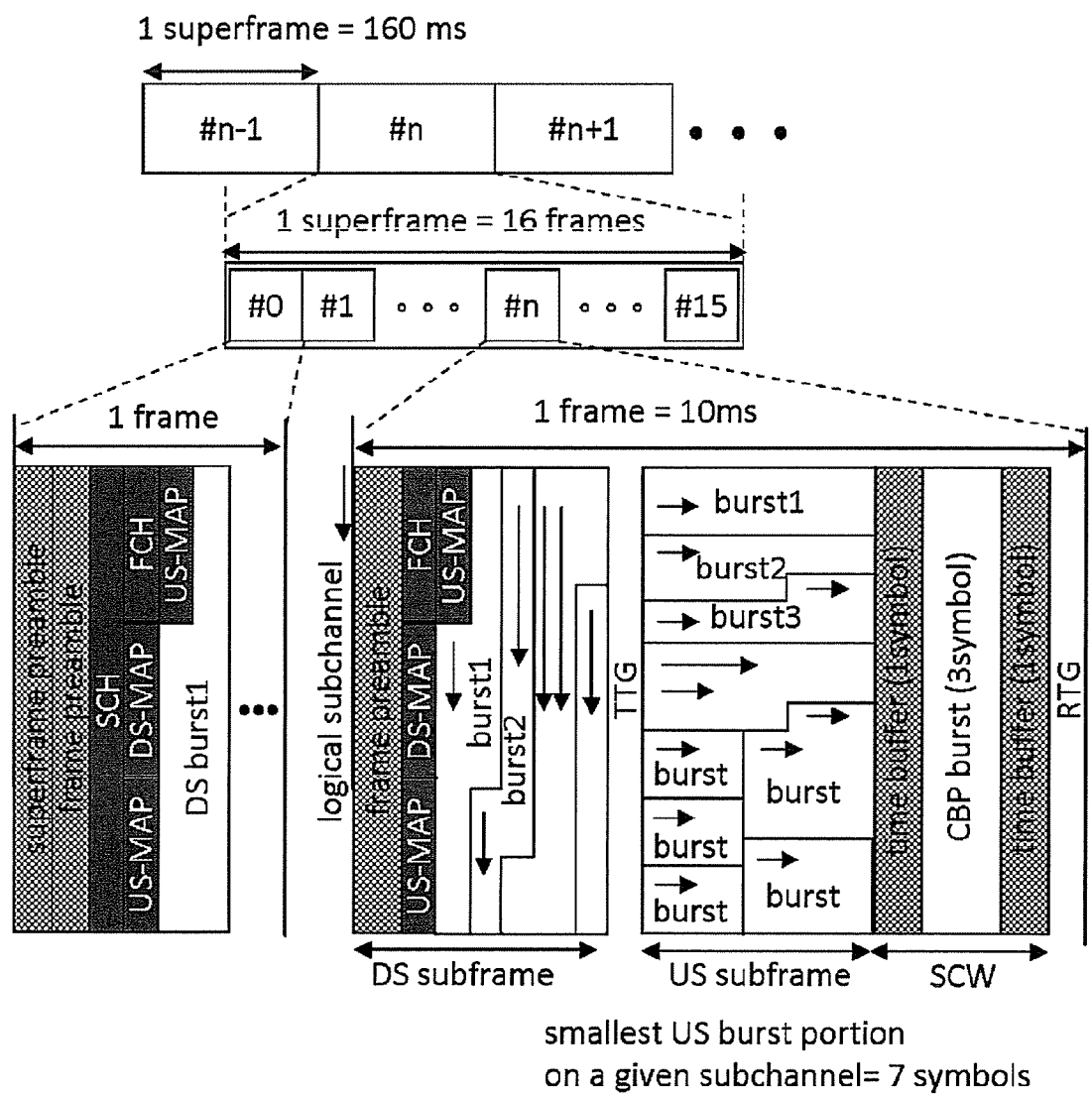
FIG. 3 is a structural diagram of a wireless frame used in the multi-channel wireless communication system according to a conventional form and the embodiment of the present invention.

FIG. 5 illustrates a MAC PDU format used for transmitting multi-channel data in the present example. MAC PDU (Protocol Data Unit) is a unit of data configuring each burst indicated in FIG. 3. In other words, burst is configured of one or more MAC PDUs, which are arranged on subchannels and symbols of OFDM. MAC PDU in the 802.22 is basically configured of MAC header with a predetermined length (32 bits for Generic MAC header), MAC payload with a variable length subsequent thereto, and CRC (Cyclic Redundancy Check) code with 32 bits subsequent thereto. A sub-header may be provided between MAC header and MAC payload, and CRC is not essential if it can use other error protection (such as check vector).

Herein, Diversity mode (0x01) of Aggregation Type corresponds to the robust mode, and Bulk transmission mode (0x02) is directed to make a plurality of channels seem one wideband transmission path and corresponds to the dispersion mode. Aggregation ID is incremented by one each time Aggregation header is newly generated, and returns to 0 next to the upper limit of 8191 (the higher 3 bits in 16 bits are reserved for the future). Aggregation ID in Diversity mode has the same value for PDUs which are redundantly transmitted in a plurality of channels from the same source. Aggregation Header is basically given to all PDUs transmitted from BS or CPE during multi-channel operation, which may be achieved if at least one transmission is performed in one PHY frame. For example, Aggregation header may be given to only PDU at the header of each burst, and is not necessary for MAC PDU of burst transmitted to the reception side which does not need to recognize or cannot recognize (conventional 802.22 system) the multi-channel operation.

Figure 6:
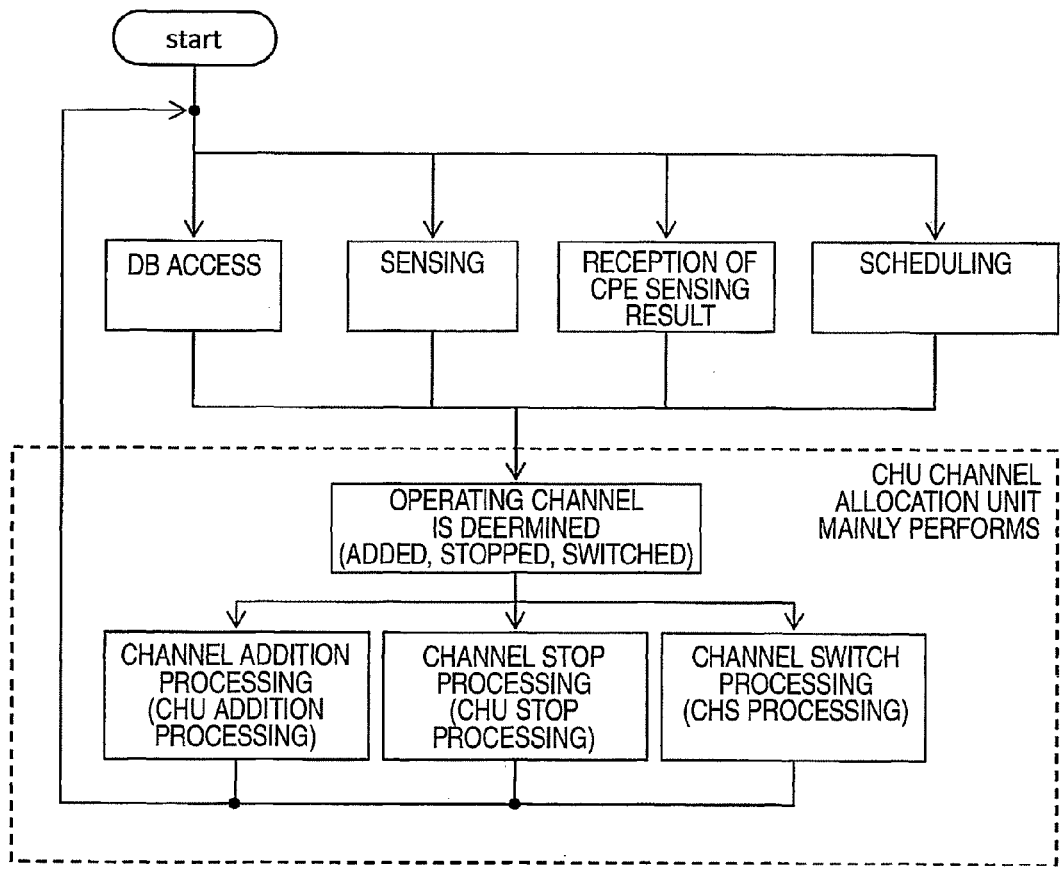
FIG. 6 is a flowchart of a channel allocation operation by CAM 41 in BS 2 according to Example 1.

FIG. 6 is a flowchart illustrating a channel allocation operation by BS-CAM 41 according to Example 1. Three basic functions including channel addition processing (CAM-ADD), channel stop processing (CAM-STP) and channel switch processing (CAM-SWH) are newly defined in order to allocate a plurality of channels. The three functions are achieved by exchanging or unilaterally transmitting predetermined messages or the like between BS and CPE as described later. BS-CAM 41 mainly determines an operating channel, and subsequently performs any of the three functions.

In BS 2, a timing when an operating channel is determined (or a channel is added, stopped and switched) by BS-CAM 41 is scheduled such that a specific channel is available when a change in WSCH is found due to reception of DB access, sensing or CPE sensing result and only in a predefined period of time. Even at the timing, there may be made a determination that BS-CAM 41 does not change an operating channel (that is, does not add or stop or switch). For example, even if a backup or candidate channel capable of being allocated for multi-channel operation is left, when no CPE having a multi-channel operation capability is present, an operating channel does not need to be further added. The multi-channel operation capability of CPE is notified by CPE via a CBC-REQ message (described later).

Figure 7:
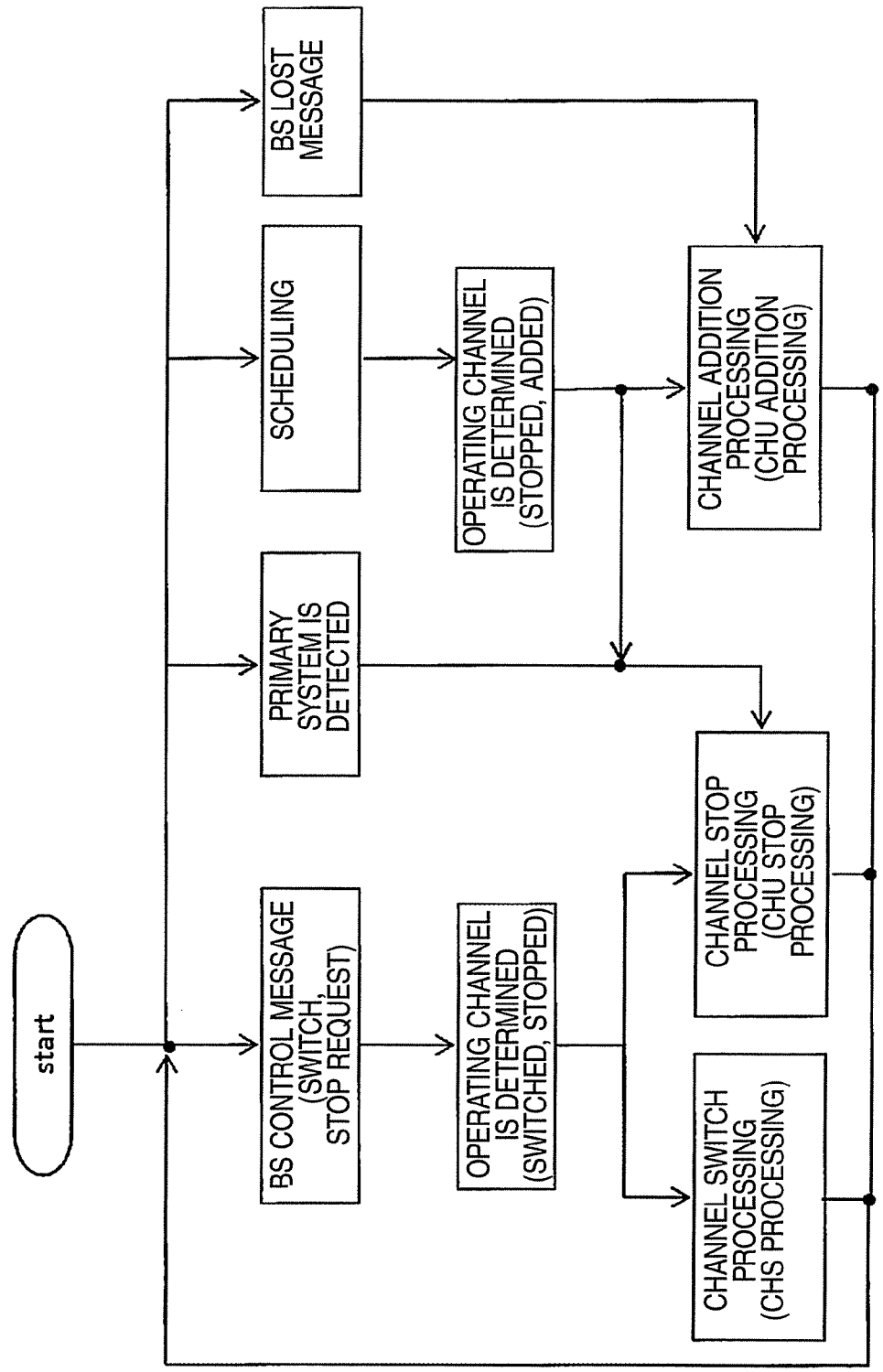
FIG. 7 is a flowchart of a channel allocation operation by CAM 81 in CPE 7 according to Example 1.

FIG. 7 is a flowchart illustrating a channel allocation operation by CPE-CAM 81 according to Example 1. CPE-CAM 81 has the three functions including the channel addition processing, the channel stop processing and the channel switch processing similar to BS-CAM 41. However, most of them are performed according to an instruction from BS-CAM 41.

That is, the channel switch processing is performed when a switch request (CAM-SWH) as a control message (management message) is received from BS.

The channel stop processing is performed when a stop request (CAM-STP) as a control message is received, when a primary system is sensed by self-sensing, or when a channel is determined to be stopped by the scheduling.

The channel addition processing may be performed when it is determined that the operation can be started in a channel by the scheduling, when a BS lost message is received from CHU 71 (or CHU non-connected with BS is present), or when aggregation information (CAM-AIF) as a control message is received (not illustrated).

Figure 8:
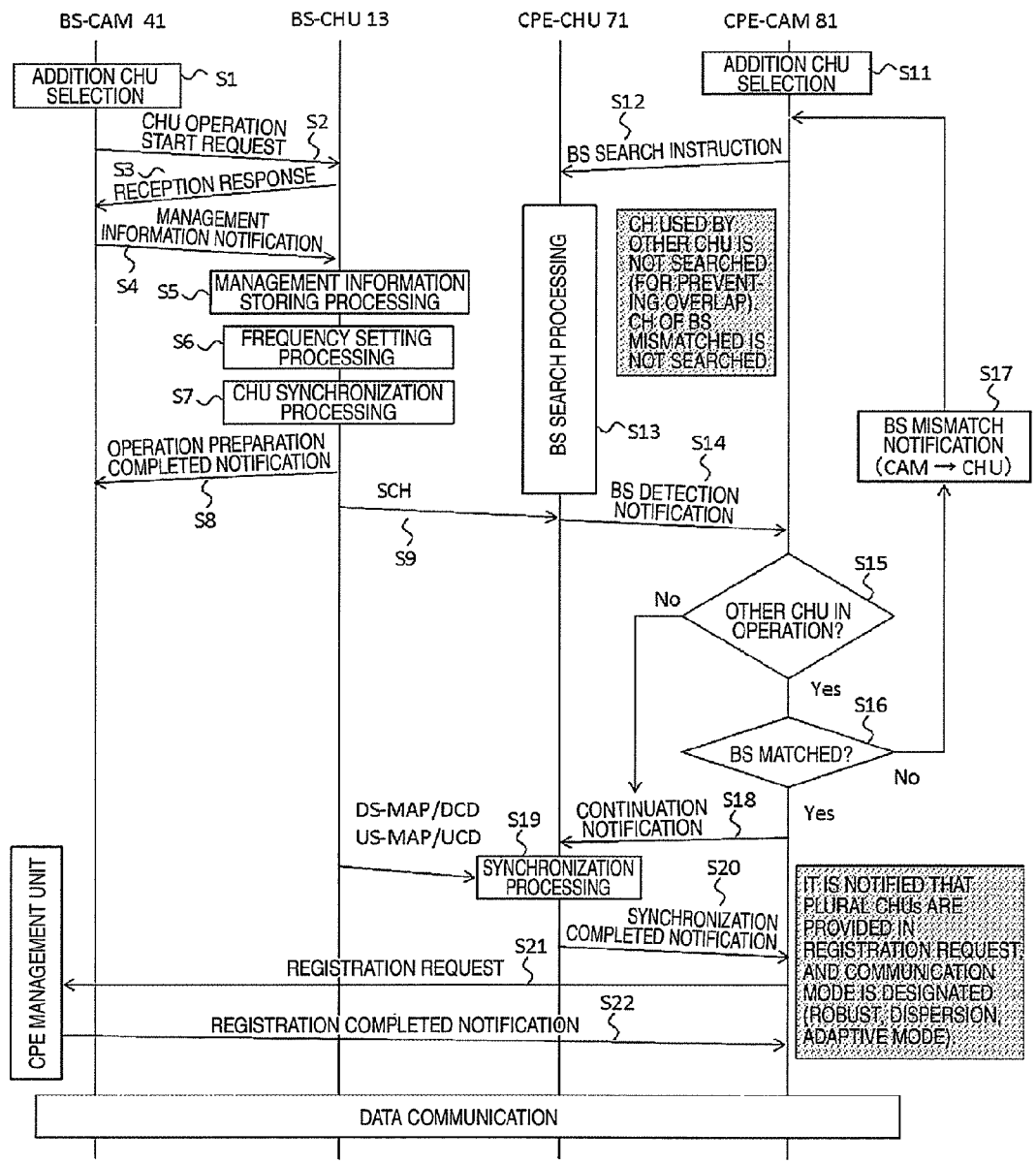
FIG. 8 is a flowchart of a channel addition processing between BS 2 and CPE 7 according to Example 1.

FIG. 8 is a flowchart of the channel addition processing performed between BS 2 and CPE 7 according to Example 1.

In step S1, BS-CAM 41 in BS 2 selects CHU to be subject to the channel addition processing. The CHU, which is not currently used (not allocated) and whose hardware accepts the frequency of a channel to be allocated, is selected from BS-CHUs 13 in BS 2. Part of step S1 may be included in the operating channel determination in FIG. 6.

In step S2, BS-CAM 41 transmits a CHU operation start request to the selected BS-CHU 13. The CHU operation start request may include various parameters on physical layer such as channel frequency (center frequency) and its offset, or part of MIB information (such as software version information).

In step S3, BS-CHU 13 transmits a start request reception response to BS-CAM 41. The start request reception response may include CHU-specific MIB information required for CHU-M (such as serial number or Device ID of CHU). When the start request cannot be received due to mismatched version, an error is responded.

In step S4, BS-CAM 41 transmits a management information notification to BS-CHU 13. The management information notification may mainly include MIB information maintained in BS-CAM 41 and required for BS-CHU 13, and may also include ID (carrier index associated with a channel frequency) for specifying connection between BS and CPE. If BS-CHU 13 has part of the MAC layer function, MIB information used for MAC, such as Station ID, or MAC address of BS 2, is required.

When three-directional communication in steps S2 to S4 is successful, in step S5, BS-CHU 13 performs a processing of storing the management information received in step S4. Part of the stored information (MIB information) is immediately reflected at each part of CHU, or is initialized for its transition state.

In step S6, BS-CHU 13 performs a frequency setting processing. Herein, a center frequency and its offset received in step S2 or S4 are reflected on a local oscillator in BS-CHU 13.

In step S7, BS-CHU 13 performs a CHU synchronization processing. The processing is directed for network synchronization for synchronizing timings of superframe, frame and TDD between a plurality of BSs in the wireless communication system, and basically synchronizes superframes at the start of each minute of UTC time acquired from GPS or the like. Consequently, CHUs in operation are synchronized with each other.

When the processings in steps S5 to S7 are successfully performed, in step S8, BS-CHU 13 transmits an operation preparation completed notification to BS-CAM 41. If the processings fail halfway, a response indicating the error is transmitted.

Subsequent to step S8, in step S9, a wireless frame including SCH is periodically transmitted. SCH may include a newly-defined CHID (Channel ID) with about 2 bits including BS_ID as MAC address of BS 2 and indicating from which BS-CHU 13 it is transmitted.

On the other hand, on the CPE 7 side, the following processings are performed irrespective of the progress of steps S1 to S8.

At first, in step S11, CPE-CAM 81 in CPE 7 selects CHU to be subjected to the channel addition processing. In many cases, the processing is started when CPE-CHU 71 in the BS lost state is caused in CPE 7, and thus the CPE-CHU 71 is selected.

In step S12, CPE-CAM 81 transmits a BS search instruction to the selected BS-CHU 13. The BS search instruction may be made by designated one or more channels, or may be directed to search all the frequencies for CHU. When a channel being used by BS 2 and not connected is determined by an extended DCD message or the like or may be estimated based on a backup channel, the channel may be designated. A channel already used by other CPE-CHU 71 is not searched for preventing overlap. Further, a channel which is determined as being used by other BS based on previous search or the like is searched at the lowest priority.

In step S13, CPE-CHU 71, upon receiving the BS search instruction, tries to detect a wireless signal (preamble and SCH) from BS at a frequency to be searched. When it can detect a wireless signal at a predetermined signal level or more, in step S14, it transmits a BS detection notification to CPE-CAM 81. The notification includes BS-ID obtained by decoding SCH.

In step S15, CPE-CAM 81 determines whether other CHU in operation (connected with any BS) is present. The absence of CHU in operation does not correspond to channel addition (multi-channel operation), and thus the processing proceeds to a synchronization processing (step S18 described later) similar to the conventional IEEE 802.22.

In step S16, when CHU in operation is present, a determination is made as to whether a connection destination of the CHU is the same as BS indicated in step S13.

When not matched, in step S17, CPE-CAM 81 transmits a BS mismatch notification as a response for the BS detection notification to CPE-CHU 71. Thereby, CPE-CHU 71 restarts to search the remaining frequencies to be searched. Alternatively, the processing returns to step S12, where CPE-CAM 81 transmits a new BS search instruction of designating another frequency to be searched to CPE-CHU 71.

When matched in step S16, in step S18, a continuation notification is transmitted as a response for the BS detection notification as needed.

In step S19, CPE-CHU 71, upon receiving the continuation notification, continues the synchronization processing at a frequency where SCH is detected. Step S19 includes a processing of receiving a UCD (Upstream Channel Descriptor) message and acquiring upstream parameters or a ranging processing of adjusting a TDD timing in addition to a narrow synchronization processing of detecting and decoding FCH or DS-MAP and acquiring downstream parameters.

Then, in step S20, CPE-CHU 71 transmits a synchronization completed notification as a response for the continuation notification to CPE-CAM 81. Thereby, CPE-CAM 81 can recognize that a plurality of CHUs are provided for BS 2 (become multi-channel), and in step S21, transmits a notification for requesting to register that CPE 7 successfully enters multi-channel (aggregation) to BS 2. The registration request includes a number (such as carrier index or CHID) capable of specifying each channel configuring the multi-channel, and can further include a designated communication mode (any of the robust, dispersion and adaptive modes). When not satisfied with the reception quality, CPE can designate the robust mode by which a diversity effect can be expected, and when not satisfied with the communication speed, it can designate the dispersion mode.

In step S22, the CPE management unit 42 in BS 2, upon normally receiving the registration request, returns a registration completed notification. Thereby, the channel addition processing is completed, and data communication is then made between BS 2 and CPE 7 in the designated mode.

CPE 13 is managed or in a state where MIB information is exchangeable by SNMP before being in multi-channel, but if MIB information or necessary setting file specific to the added channel is present, after acquisition of the same, the completed registration for the added channel may be explicitly notified in a management message.

Figure 9:
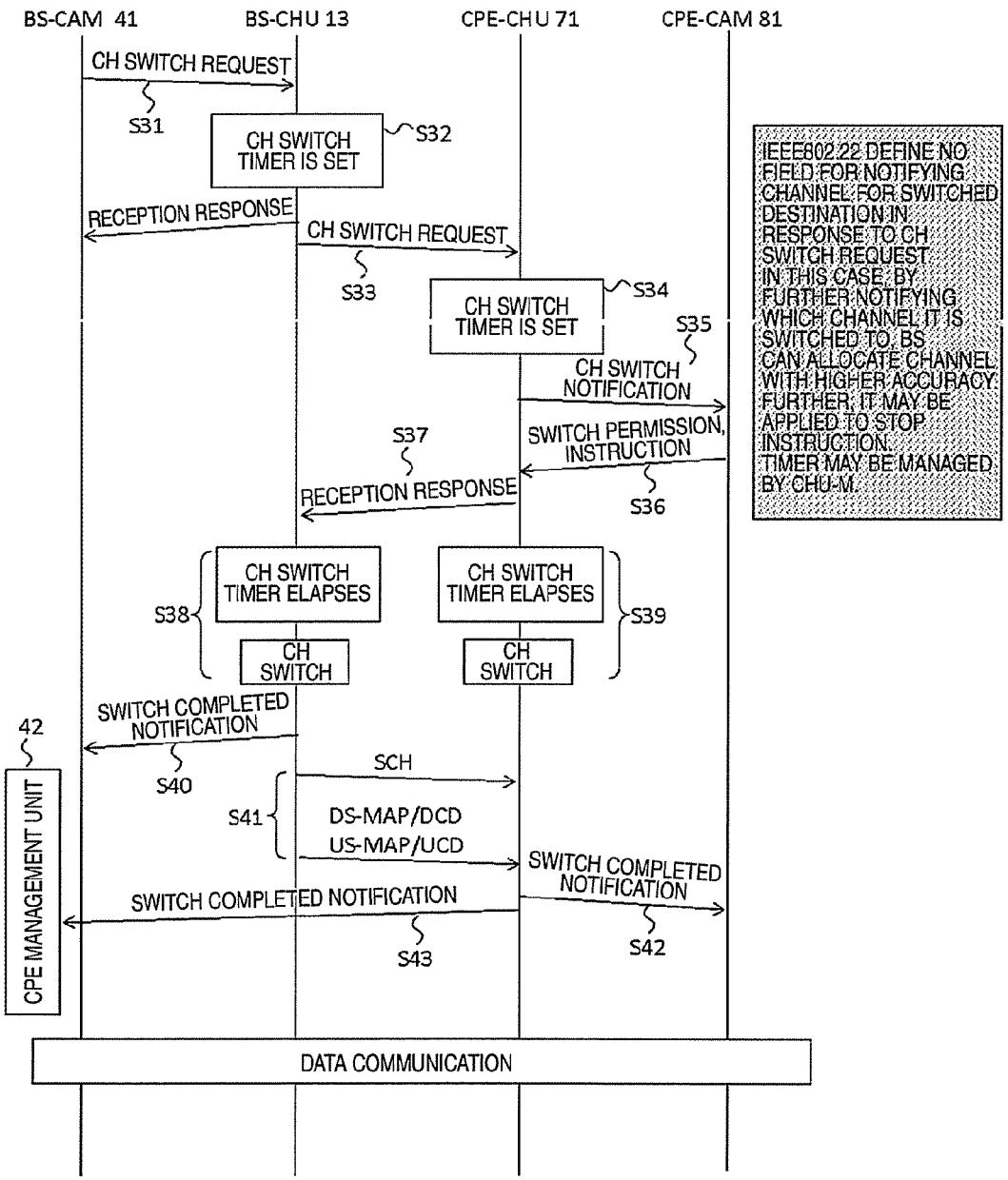
FIG. 9 is a flowchart of a channel switch processing between BS 2 and CPE 7 according to Example 1.

FIG. 9 is a flowchart of the channel switch processing performed between BS 2 and CPE 7 according to Example 1.

In step S31, BS-CAM 41 in BS 2 transmits a CH switch request to BS-CHU 13 to be subject to channel switching. The BS-CHU 13 has to accept a channel frequency in the switched destination.

In step S32, BS-CHU 13, upon normally receiving the CH switch request, sets a channel switch timer. BS-CHU 13 always counts a frame number, and setting the timer indicates determining a future frame number to be changed.

In step S33, BS-CHU 13 transmits a reception response for the CH switch request to CAM. Further, the CH switch request is downstream transmitted. The CH switch request is a management message, and is different from the CH switch request in step S31 which is just a signal in the device. The management message has a data structure starting with a predetermined Type field, and is sent to all of CPE in broadcast connection. Each CPE has to receive and interpret all the management messages in principle.

The CH switch request according to Example 1 is newly defined by adding a field or information element indicating a channel number of a switch destination as in a DREG-CMD message to a CHS-REQ message with Management Message Type=26 defined in the IEEE 802.22-2011, and has information for specifying a (incumbent) channel to be changed, or a Switch Count field indicating the number of remaining frames until switching. The information element indicating a channel number may be a channel number (carrier index) itself, or may indicate what number channel in a list of backup and candidate channels included in a DCD (Downstream Channel Descriptor) message as another management message. The information for specifying a channel after being switched may be also a channel number itself, or ID (such as CHID) for identifying connection (association) between CHU on the BS side and CHU on the CPE side, and may be replaced with SID (Station ID), CID (Connection ID), or the like.

The DCD Channel information elements may additionally include a field or information element similar to the CH switch request. Further, when the management messages are classified per channel by use of only the dispersion mode, the information for specifying a channel after being switched is not necessarily needed.

In step S34, CPE-CHU 71 in CPE 7, upon normally receiving the CH switch, request sets a CH switch timer.

In step S35, CPE-CHU 71 notifies CPE-CAM 81 of reception of the CH switch request.

In step S36, CPE-CAM 81, upon grasping that the channel is to be changed, performs switch permission (instruction) if there is no problem is in the channel to be switched.

In step S37, CPE-CHU 71, upon receiving the switch permission upstream, transmits a reception response for the CH switch request in step S33 to BS 2. The reception response is also a management message, and newly defines and employs a similar message to a CHU-REP message with Management Message Type=27 according to Example 1.

In step S38, when the CH switch timer reaches a set frame number and ignites, BS-CHU 13 performs channel switching. That is, the operational parameters are changed within a frame border (RTG) time, and a frequency of the local oscillator is synchronized with a channel of the change destination. In most cases, since the channel switching is performed when an incumbent channel has to be released, even when a reception response in S37 cannot be received from any CPE, the channel switching is absolutely performed.

At the same time with step S38, in step S39, the channel switching is performed also in CPE 7 when the timer elapses.

Then, in step S40, BS-CHU 13 in BS 2 transmits a switch completed notification to BS-CAM 41. This indicates that the switching is completed (the frequency of the local oscillator is locked, or the like) in the physical layer.

Next, in step S41, BS-CHU 13 transmits SCH, DS-MAP, DCD, and UCD.

Next, in step S42, when receiving a frame including SCH and correctly receiving the SCH or the like, CPE-CHU 71 in CPE 7 transmits a switch completed notification to CPE-CAM 81. The switch completed notification indicates that the switching is temporarily completed in the MAC layer.

At last, in step S43, CPE-CHU 71 transmits a switch completed notification (CHS-CPLT) to BS 2. The switch completed notification is a management message, and is newly defined similar to a CHS-RSP message according to Example 1, and the CPE management unit 42 in BS 2, upon receiving the same, updates its holding information on CPE.

In the channel switch processing, the timer may be managed in CAM. For example, the CH switch request in step S33 may be received by CPE-CAM 81, and CPE-CHU 71 may be instructed to set the timer.

Figure 10:
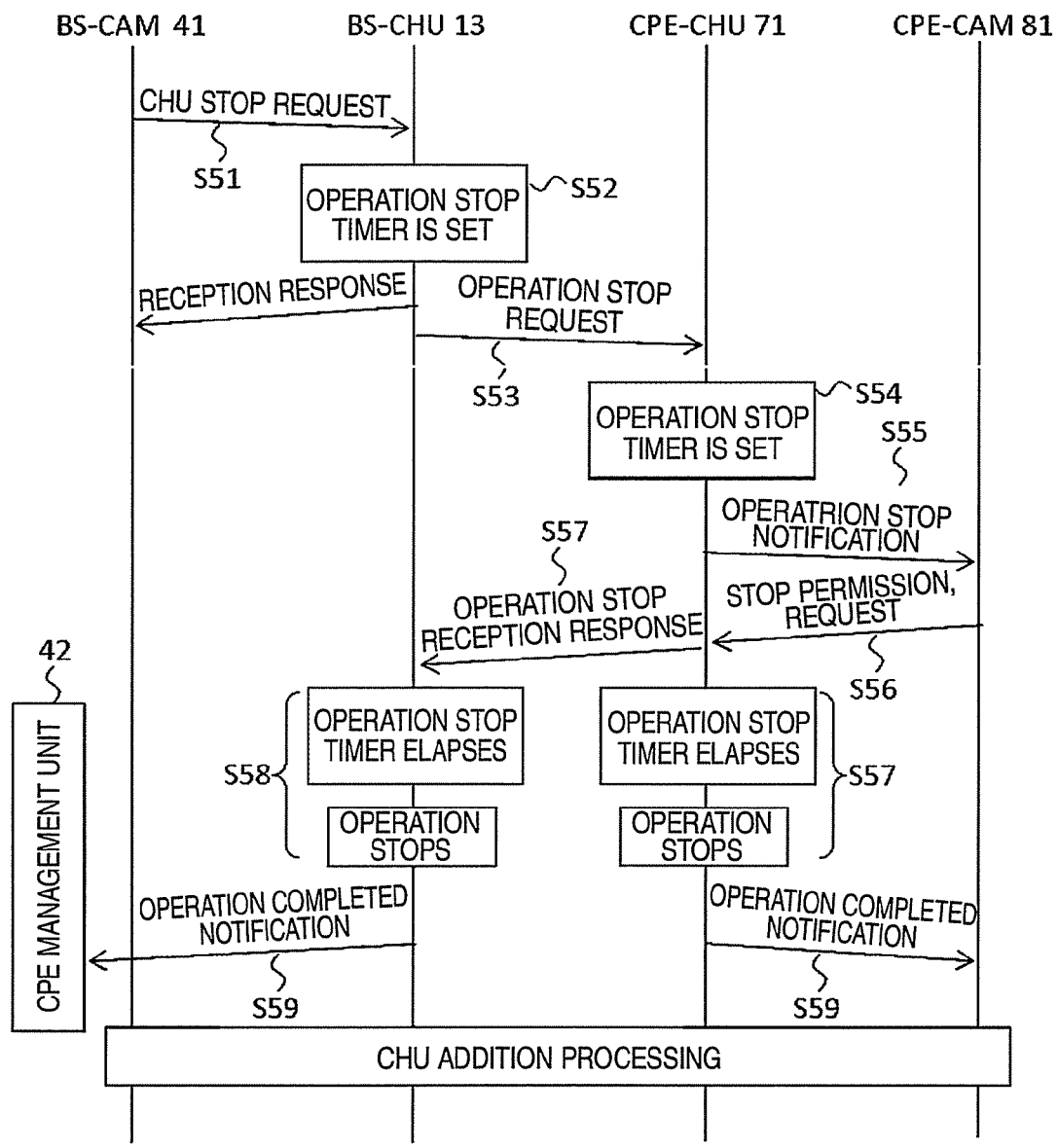
FIG. 10 is a flowchart of a channel stop processing between BS 2 and CPE 7 according to Example 1.

FIG. 10 is a flowchart of the channel stop processing performed between BS 2 and CPE 7 according to Example 1.

In step S51, BS-CAM 41 in BS 2 transmits a CHU stop request to BS-CHU 13 to be subject to channel stop.

Then, in step S52, BS-CHU 13, upon receiving the CH stop, request sets an operation stop timer. Setting the timer indicates determining a future frame number to be stopped.

Then, in step S53, BS-CHU 13 transmits a reception response for the CH stop request to BS-CAM 41. Further, it downstream transmits an operation stop request. The CH stop request is a management message, and in Example 1, a new message (CHOS-REQ) is defined in which a Switch Count field or Next Channel Number field and information for specifying a channel to be stopped are added to a DREG-CMD (De/Re-Register Command) message with Management Message Type=21 or CHS-REQ message.

DREG-CMD intends to cause all CPE to immediately stop transmitting at incumbent operating channels for protecting the primary system, and cannot be transmitted from any CHU until new DREG-CMD for permitting transmission at the frequency is issued. A CHS-REQ message with Management Message Type=28 intends to provide a temporary quiet period (QP). To the contrary, the operation stop request in the present example intends to separate (release) only specific CHU from CAM, and does not perform reception in an operating channel. The CH stop request may be realized by designating Null as a channel number of the switch destination in the CH switch request in the management message used in the channel switch processing in FIG. 9.

Then, in step S54, CPE-CHU 71 after receiving the operation stop request determines whether the request is directed for itself based on the information for specifying a channel to be stopped indicated by the request, and when the request is directed for it, CPE-CHU 71 sets an operation stop timer similarly as in step S52.

In step S55, CPE-CHU 71 notifies CPE-CAM 81 of reception of the operation stop request.

In step S56, CPE-CAM 81, upon grasping that the channel operation is to be stopped, makes stop permission and request.

In step S57, CPE-CHU 71 receiving the stop permission and request upstream transmits an operation stop reception response for the operation stop request in step S53 to BS 2. The reception response is also a management message, and a similar message to a CHS-RSP message or the like is newly defined for use in Example 1.

In step S58, when the operation stop timer reaches a set frame number and ignites, CPE-CHU 71 stops operation. That is, transmission and reception are completely stopped and the operating channel is also forgotten.

At the same time with step S58, in step S59, the operation is stopped also in BS-CHU 13 in BS 2 when the timer elapses.

At last, in step S59, CPE-CHU 71 and BS-CHU 13, for which operation is completely stopped, transmit an operation completed notification to CPE-CAM 81 and the CPE management unit 42.

The operation-stopped CHU may be then subject to the CHU addition processing.

The timer may be managed in CAM in the channel stop processing.

As described above, in the present example, the CH switch request is transmitted (only) in the switch source channel, and the operation stop request is transmitted (only) in the channel to be stopped. That is, a management message is not forced to be received in a channel not to be switched or stopped for switching or stopping, or a master-slave relationship is not provided for the channels. Thereby, as described in Patent Literature 1, unlike when a management message is transmitted and received only in a specific control channel (main carrier wave) defined by BS, a channel may be accurately switched or stopped for CPE in the environment in which cannot receive such a control channel.

Example 2

Figure 11:
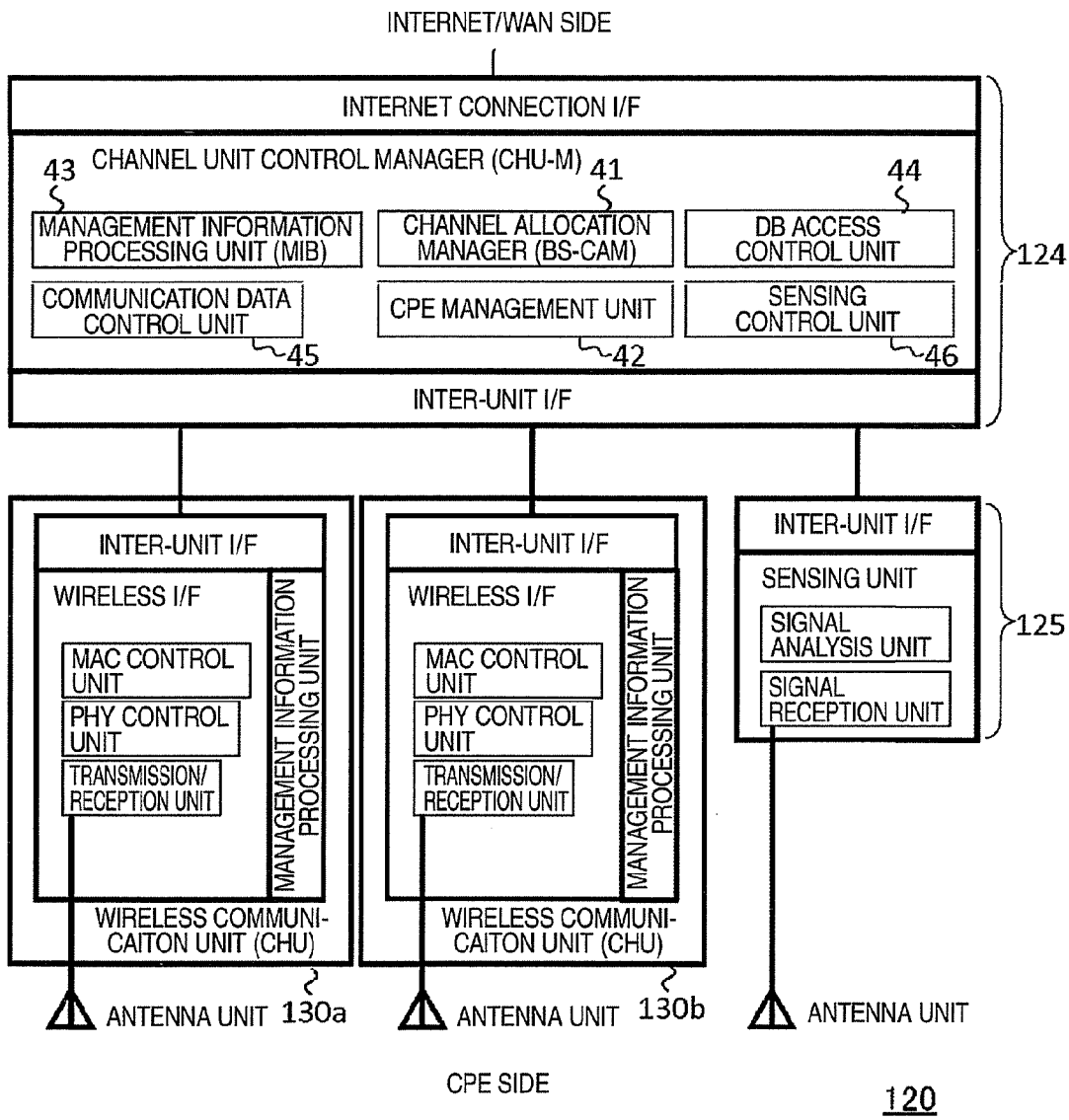
FIG. 11 is a functional block diagram of BS 120 in the multi-channel wireless communication system according to Example 2.
Figure 12:
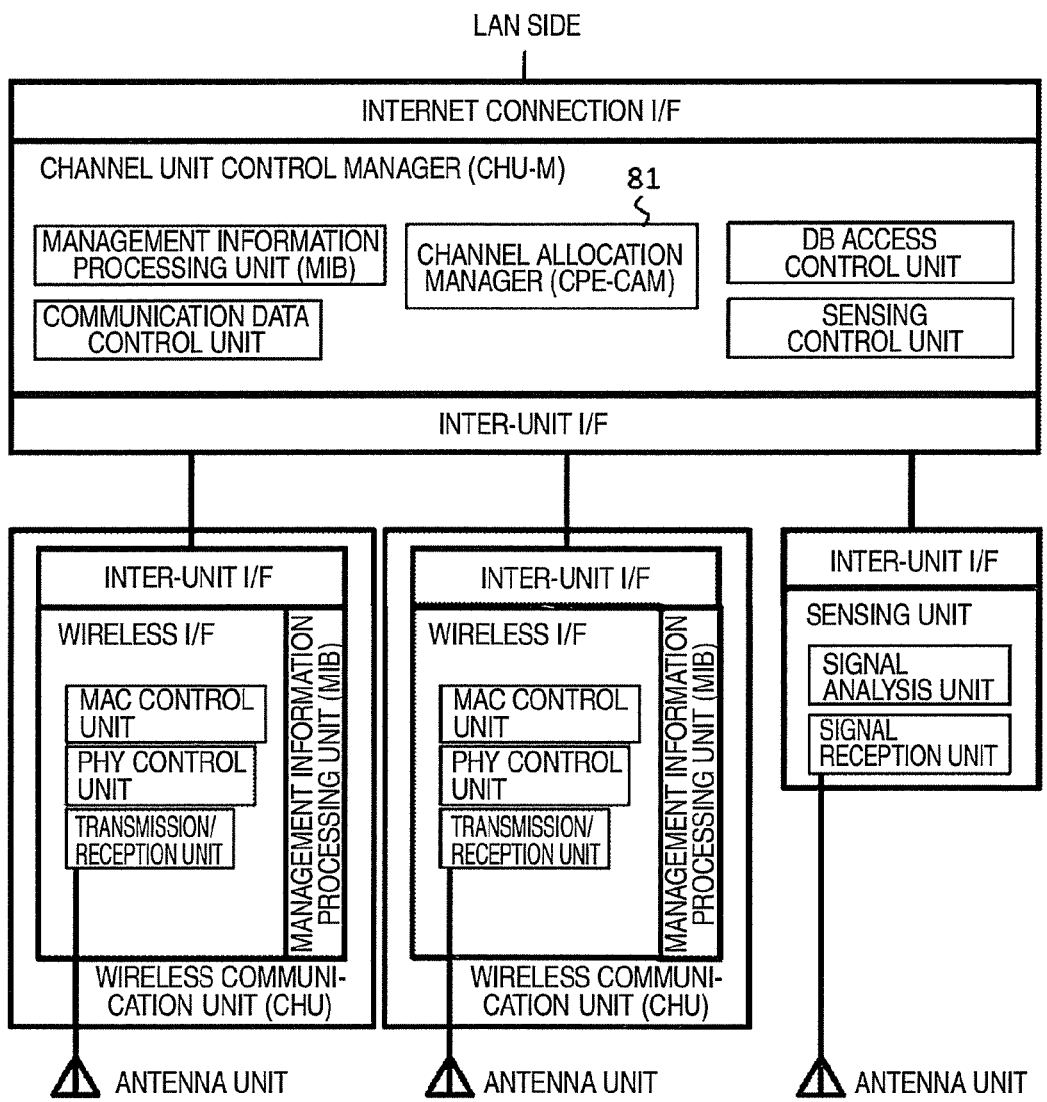
FIG. 12 is a functional block diagram of CPE 170 according to Example 2.

FIG. 11 is a functional block diagram of BS 120 in a multi-channel wireless communication system according to Example 2. Additionally, FIG. 12 is a functional block diagram of CPE 170 in the multi-channel wireless communication system according to Example 2. In the present example, detailed mounting not described in Example 1 will be described, and unless otherwise noted, the structure and functions according to Example 1 will be employed. FIG. 11 and FIG. 12 express hardware in more detail than FIG. 4.

As illustrated in FIG. 11, BS 120 includes a plurality of BS-CHUs 130a, 130b (collectively denoted as 130), a CHU-M 124, and a sensing unit 125.

CHU-M 124 includes the channel allocation manager (CAM) 41 for allocating operating channels to individual BS-CHUs 130, the CPE management unit 42 for holding information on CPE 170 connected to BS 2 and managing states of CPE, a management information processing unit (MIB) 43, a DB access control unit 44, a communication data control unit 45, and a sensing control unit 46.

The channel allocation manager (BS-CAM) 41 corresponding to BS-CAM described in Example 1 is directed for managing channels, and performs the processings of adding, stopping and switching channels while communicating predetermined management messages with CPE, thereby realizing multi-channel MAC. BS-CAM 41 grasps a frequency acceptance situation, use situation, transition state and the like of each BS-CHU 130 in at least its own BS 120, and performs channel descriptor management such as management for allocating frequencies accepted by BS-CHU and in a WSCH list, or generation of SCH and DCD. BS-CAM 41 has a function on a higher layer (Network Control and Management System), and has effects on operating channel determination.

The CPE management unit 42 maintains the latest information on all CPE 170 connected to BS 120 acquired in a management message or the like in the table, and responds to inquiries from others. The table holds therein, per CPE, ID for specifying CPE, any of Device ID, serial number or station ID, information specific to each CPE such as MAC address of CPE 170 (CHU-M in CPE), the number of CHUs, ID (CHUID) or channel number per CHU, and state. The state includes information such as discrimination among stopped, synchronized (connected), and managed node, multi-channel or not, and mode in multi-channel. Information on CHU in each CPE is limited to a graspable range, and does not need to include CHU connected to other base station, for example.

When BS operates in multi-channel, the CPE management unit 42 controls (channel scheduling) to divide or duplicate data into channels per CPE.

The information management processing unit 43 maintains the latest MIB information by use of SNMP (Simple Network Management Protocol) or the like thereby to respond to inquiries from others, or directly gives it from the hardware. BS or CPE for which updated MIB is kept by SNMP is called managed node.

The DB access control unit 44 uses PAWS (Protocol to Access White Space database) or the like to find the DB server 6 over the Internet, to access it to acquire a WSCH list, or to notify its occupied channel or a channel detecting a primary system to the DB server 6. The information is reflected on MIB in the information management processing unit 43 as needed.

The communication data control unit 45 controls and buffers queue, transmission order or flow depending on a class of data (data plane), and MAP-allocates the same together with management plane or cognitive plane's communication data (such as management message). Information on mapping determined by MAP allocation in a management message such as DS-MAP or US-MAP is output to each BS-CHU 130 together with corresponding communication data. MAP allocation of upstream subframes is performed based on band request or reception state from each CPE. During multi-channel operation, the allocation processing is performed across a plurality of channels. That is, a determination is made based on a predetermined scheduling rule and a multi-channel communication mode as to on which burst in which channel data of each queue or each CPE is placed. The upstream data received from a plurality of BS-CHUs 130 may be converged or organized (discarding redundant packets) in the communication data control unit 45, but may be processed in a convergence sublayer higher in the MAC layer, or a much higher layer.

The sensing control unit 46 functions as SM (Spectrum manager) and its higher layer, and controls the sensing unit 125 or the like based on spectrum sensing automaton (SSA) to perform sensing (Out-of-band sensing). Information (such as UCS) acquired from BS-CHU 130 is mainly used for In-band sensing. The list of channels holding classified available channels is updated based on the sensing information. The available channels in the list are classified into "Disallowed", "Operating", "Backup", "Candidate", "Protected", and "Unclassified."

The sensing unit 125 includes a signal reception unit and a signal analysis unit, and provides the sensing control unit 46 with the spectrum sensing function as a physical layer.

Each BS-CHU 130 according to the present example includes a MAC processing unit 131, a PHY processing unit 132, a transmission/reception unit 133, a management information processing unit 134, an inter-unit I/F 135, and an antenna 136. Each BS-CHU 130 includes specific CHUID.

The MAC processing unit 131 performs a MAC processing at a lower level by one channel. The MAC processing includes a processing according to an instruction from CHU-M or a security layer processing, such as a processing of making MAC PDU from CHU-M or communication data of burst unit into MAC frames based on information indicating MAP allocation acquired from the communication data control unit 45 or its reverse de-frame processing.

The PHY processing unit 132 is configured of a digital signal processing device, receives MAC frames from the MAC processing unit 131 to perform channel encoding, burst modulation, physical framing, OFDM modulation and D/A conversion thereon to output to the transmission/reception unit, and performs the processings reverse to them. The PHY processing unit 132 performs MIMO or adaptive antenna processing as needed.

The transmission/reception unit 133 is configured of a high frequency device or the like, and performs conversion between wireless frequency and intermediate frequency, power amplification of transmission signal, control of transmission power, amplification of reception signal, measurement of reception power, control of reception gain, and the like.

The processings for transmission in the MAC processing unit 131 to the transmission/reception unit 133 are performed on receiving mapping information from the communication data control unit 45, which may be assumed as transmission instruction.

The management information processing unit 134 gives MIB information or the like to the MAC processing unit 131, the PHY processing unit 132 or the transmission/reception unit 133, or acquires the same therefrom, and manages MIB in association with the management information processing unit 43. MIB information to be held by the management information processing unit 134 includes a table indicating a correspondence between a channel number (carrier index) and an actual carrier frequency. The management information processing unit 134 holds information or the like required to accurately manage transmission power or antenna directivity in addition to the information defined for MIB irrespective of a channel unit or frequency, and controls the PHY processing unit 132. For example, properties specific to each channel unit (such as available frequency range, and values of gain, delay and the like at each channel frequency in the range. Properties of power supply line connecting channel unit and antenna are included.) are previously held, and compensation or notification to the MAC layer is performed based on the information. Information on a channel in which the capability of the transmission/reception unit is inadequate and use of it is posteriori prohibited or transmission power is limited is held and is notified to the MAC layer.

The GPS unit provides geographic location information on BS 2 required to acquire a WSCH list from the DB server 6, and is operable as a high-accuracy clock for synchronizing a plurality of BS or a high-accuracy frequency source.

The antenna 135 is configured to be provided per CHU in the present example, but not limited thereto, the antenna may be commonly used with a CIB (Constant Impedance Band-pass) common device or butler matrix.

The structure of CPE 170 illustrated in FIG. 12 is schematically the same as BS 120 except that the CPE management unit is not provided.

Figure 13:
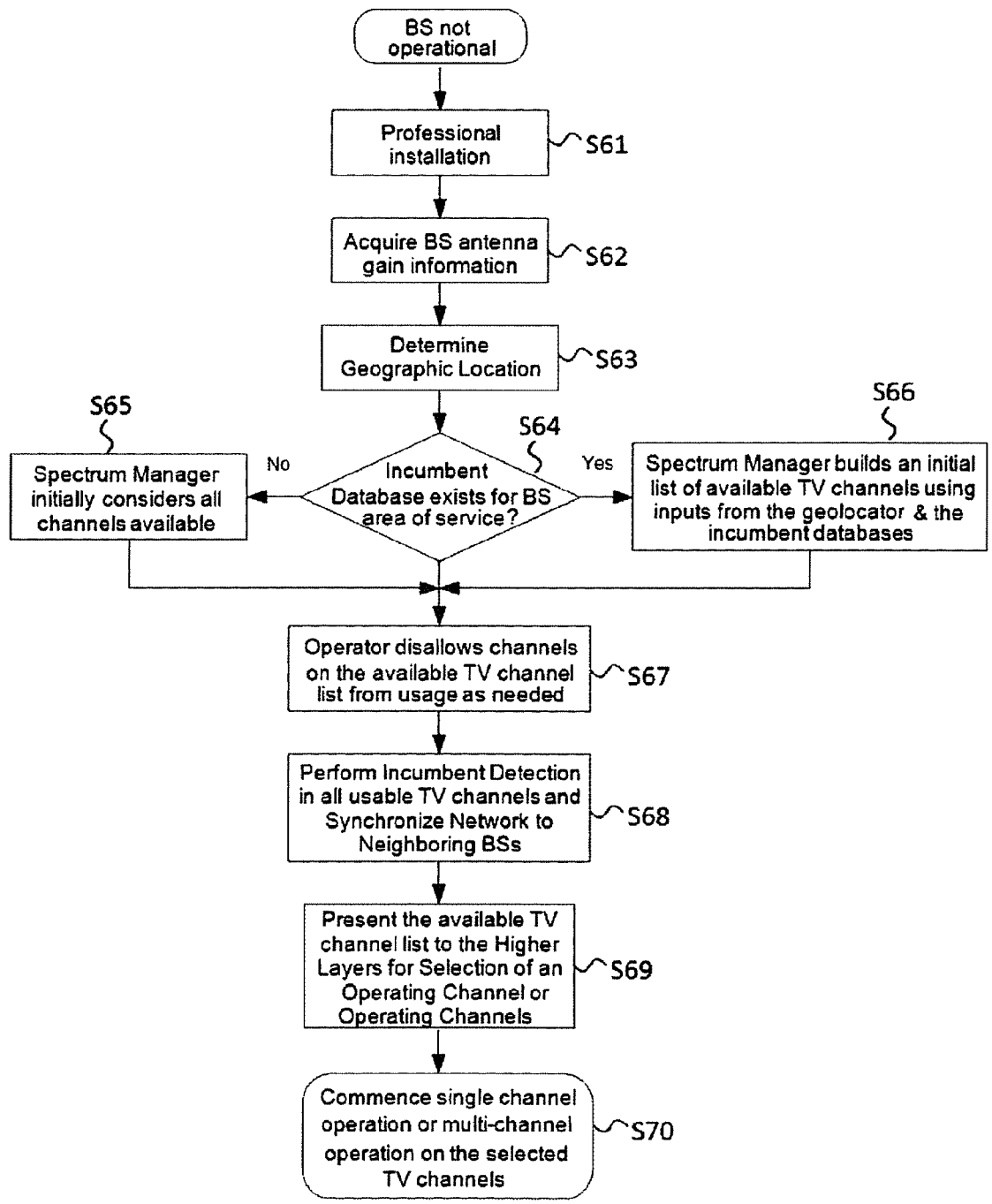
FIG. 13 is a flowchart of an initialization processing in BS 120 according to Example 2.
Figure 14:
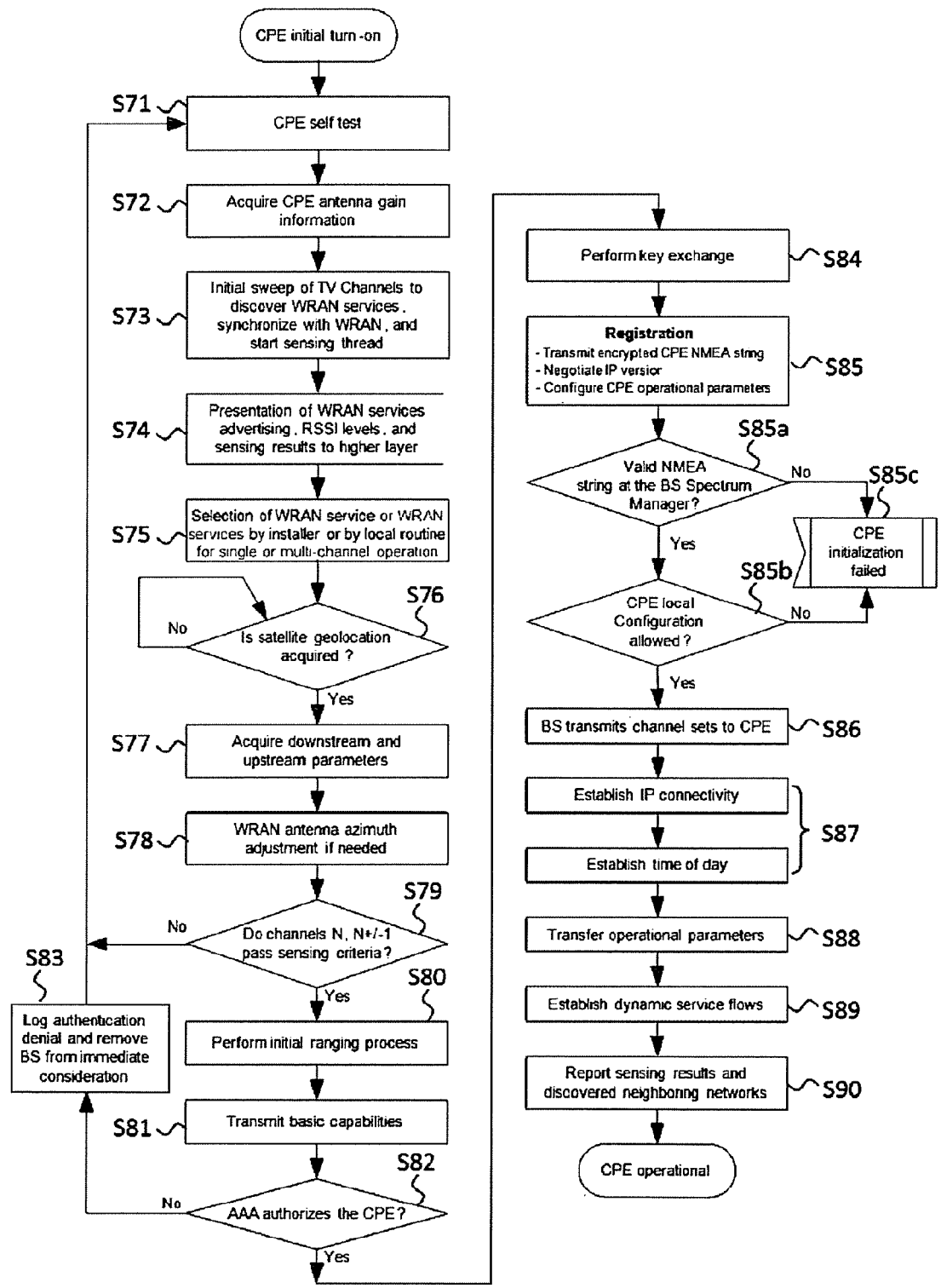
FIG. 14 is a flowchart of an initialization processing in CPE 170 according to Example 2.

The initialization processings in BS 120 and CPE 170 according to the present example will be illustrated in FIG. 13 and FIG. 14, respectively.

As illustrated in FIG. 13, the initialization processing in BS 120 according to the present example is different from the initialization processing in the 802.22 in that a step (S69) of presenting a list of available TV channels to higher layers, and a step (S70) of starting a multi-channel operation after the presentation are newly provided after the primary system detection processing or at the end of the initialization processing.

At first, in step S61, BS 120 is installed by an expert.

Then, in step S62, antenna information including an antenna gain table is acquired. The antenna gain table is stored in MIB in the management information processing unit 41, but if not, is acquired from an antenna (antenna unit) via serial communication.

Then, in step S63, geographic location (longitude and latitude of WGS 84 geodetic system) of BS 120 is determined.

Then, in step S64, a determination is made as to whether WSDB is present (or accessible) in a service area of BS 120. When it is determined that WSDB is not present, in step S65, the spectrum manager (the sensing control unit 46) in BS 120 considers all the channels initially available.

When it is determined that WSDB is present, in step S66, a list of initially available channels (WSCH list) is received from WSDB based on primitive such as M-DB-AVAIL-ABLE-REQUEST.

Then, in step S67, the operator of BS 120 makes part of the initially available channels unavailable as needed.

Then, in step S68, an existing system is detected and network synchronization with other neighboring BS is made in all the available channels.

Then, in step S69, the spectrum manager in BS 120 presents a list of available channels to a higher layer (Network Control and Management System) by use of M-AVAIL-TV-CH-REPORT primitive in order to select one or more operating channels. A format of M-AVAIL-TV-CH-REPORT.request primitive is indicated in Table 2.

TABLE 2

| Name | Type | Valid Range | Description |
|---|---|---|---|
| For (i=1; i≤ Number of Channels Available; i++) { Channel_Number Maximum Allowed EIRP } | List of available channels and their Maximum Allowed EIRP | | List of available channels and corresponding Maximum Allowed EIRP. |
| Mode | | | The expected response from the higher layers<br>0 = Test<br>1 = Request for disallowed channel classification<br>2 = Request for selection of operating channel<br>3 = Request for selection of operating channels in multi-channel operation mode |

The M-AVAIL-TV-CH-REPORT.request primitive is used for requesting to designate a disallowed channel or to select an operating channel, has a mode parameter extended as compared with the 802.22, and designates mode=2 on activation for single carrier operation and mode=3 on activation for multicarrier operation. Thereafter, one or more operating channels selected from a higher layer by use of M-OPERATING-TV-CH or M-OPERATING-TV-CHS primitive are notified to the spectrum manager and are reflected on MIB. A format of M-OPERATING-TV-CHS.indication primitive according to the present example is indicated in Table 3.

TABLE 3

| Name | Type | Valid Range | Description |
|---|---|---|---|
| For (i=1; i≤ Number of ChannelsinMulti-channel Operation; i++) { Channel_Number } | The selected operating channels in multi-channel operation mode | | The selected operating channels in multi-channel operation mode |

The M-OPERATING-TV-CHS.indication primitive is used by a higher layer in order to respond a plurality of operating channels selected from the list of available channels for each request from the spectrum manager in the multi-channel operation mode. The operating channels are indicated by a number (Channel-Number) indicating what number channel from the header in the list of available channels presented in M-AVAIL-TV-CH-REPORT.request.

The higher layer can arbitrarily select an operating channel from the list of available channels, and can actually use it in hardware of each CHU provided in BS based on a spectrum sensing result, and a channel with a least possible interference is desirably selected. When the multicarrier operation is denied by the higher layer, the spectrum manager may issue M-AVAIL-TV-CH-REPORT primitive with mode=2 again, and may receive one operating channel.

At last, in step S70, the single carrier operation or multicarrier operation is started in the selected operating channel.

As illustrated in FIG. 14, the initialization processing in CPE 170 is different from the initialization processing in the conventional 802.22 in that a step (S75) of selecting a 802.22 service on installation or activation is newly provided after the physical layer acquires similar (compatible) 802.22 service advertising, reception signal level and sensing result or before GPS positional information is completely acquired.

At first, in step S71, CPE 170 performs self-test.

Then, in step S72, self-antenna gain information is acquired similarly as in step S62 in BS.

Then, in step S73, a WRAN service by BS is sensed and synchronized. In this step, a sensing thread starts to detect an existing system (TV) in transmission.

Then, in step S74, the spectrum manager in CPE 170 presents a sensing result to a higher layer (application layer). Specifically, the spectrum sensing automaton (SSA) in the spectrum manager issues M-WRAN-SERVICE-REPORT primitive, and requests the application to select a plurality of channels from a list of available WRAN services. The M-WRAN-SERVICE-REPORT.request primitive includes a list containing available WRAN services, their frequency channels, and reception signal levels (RSSL).

Then, in step S75, when trying multicarrier operation, the application selects a plurality of WRAN services from available BSs based on the presented sensing result (presence of available BSs and existing systems specified in the area). That is, whether to employ multicarrier operation or single carrier operation is determined by the application. For example, multi-channel compatible services can be preferably selected or selected vice versa depending on the number of provided CHUs.

Then, M-WRAN-SERVICE-RESPONSE primitive including information on the selected channels is issued as a response for the M-WRAN-SERVICES-REPORT.request toward SSA. M-WRAN-SERVICES-RESPONSE.indication primitive according to the present example is newly defined with extended M-WRAN-SERVICE-RESPONS in responding one selected channel, and a format thereof is indicated in Table 4.

TABLE 4

| Name | Type | Valid Range | Description |
|---|---|---|---|
| For (i=1; i≤ Number of ChannelsinMulti-channel Operation; i++) { Channel_Number } | The selected operating channels in multi-channel operation mode | | The selected operating channels in multi-channel operation mode |

In the present example, the selected channels are indicated by channel numbers.

After receiving the selected channels, SSA more strictly performs sensing again in the selected channels and their adjacent channels, and detects whether a weak existing service is hidden behind the WRAN services in the selected channels.

Then, in step S76, valid geographic location data is collected by use of GPS. If data collection fails, CPE cannot continue initialization.

Then, in step S77, upstream and downstream parameters are acquired from the selected WRAN services.

Then, in step S78, if necessary, azimuth (radiation beam direction) of the antenna in CPE is directed toward BS or in a direction with less pre-interference or interfered. An adjusted azimuth angle (measured clockwise with true north at 0 degree) is reflected on MIB, and is notified to the BS side.

Then, in step S79, when one (channel N) of the selected channels and its adjacent channels pass sensing and successfully detect a timing when a ranging request is possible, CPE performs initial ranging with BS.

Then, in step S80, a determination is made as to whether one (channel N) of the selected channels and its adjacent channels meet the sensing criteria and successfully detect a timing when a ranging request is possible. If they are not successful within a predetermined time, CPE performs initialization from the beginning again.

When it is determined that they are successful, in step S80, CPE performs initial ranging with BS.

Then, in step S81, CPE transmits self basic capabilities to BS according to a CBC-REQ message. The CBC-REQ (CPE Basic Capability REQuest) message is a management message (described later) with Management Message Type=19 which is transmitted only on initialization of CPE in principle, and the basic capabilities include physical parameters supported by CPE, such as maximum EIRP transmitted from CPE, modulation system accepted by CPE, or whether a multi-channel operation capability is provided. The multi-channel operation capability is newly defined as information element called "Multi-channel operation supported" as indicated in Table 5.

TABLE 5

| Element ID | Length (bytes) | Value | Scope |
|---|---|---|---|
| 8 | 1 | 0x00: Multi-channel operation not supported.<br>0x01: Multi-channel operation supported.<br>0x02-0xFF: Reserved. | CBC-REQ, CBC-RSP |

Whether the multi-channel operation capability is actually exercised even if CPE transmits 0x01 depends on CPE. For example, it is possible that CPE-CHU in the BS lost state may not be subjected to the channel addition processing in S11 in FIG. 7 in order to save power.

Then, in step S82, an AAA (Authentication, Authorization, and Accounting) service in a higher layer tries CPE authentication.

When authentication fails, in step S83, CPE records the authentication denial result and does not consider BS that denies the authentication for a while. Also on the BS side, temporary registration of CPE on successful ranging is erased.

When authentication is successfully made, in step S84, AAA performs key exchange between BS and CPE.

Then, in step S85, a REG-REQ/RSP message is exchanged thereby to register CPE. The REG-REQ message transmitted from CPE to BS includes information elements indicating the CPE capabilities such as character string of NMEA 0183 format as a measurement result of CPE's geographic location, or whether to support ARQ.

The spectrum manager in BS determines whether an NMEA character string is valid, and if valid, returns REG-RSP including CPE setting (such as IP version, or IP address used for preliminary management connection) corresponding to the CPE capabilities (step S85a). If invalid, the initialization fails (step S85b). Thereafter, CPE collates the CPE setting designated in REG-RSP with its capabilities, and when being able to perform the CPE setting, it is permitted to enter the network (step S85c). Thereafter, when it is confirmed that MIB information can be exchanged between BS and CPE, registration is achieved.

Then, in step S86, BS transmits a DCD message including a channel set to CPE. The channel set is called when part or all of the channel lists managed by the spectrum manager is sent in DCD or the like. "Operating" described herein indicates operating also in a destination CPE, and does not include a channel which is being initialized. Therefore, the channel set transmitted to CPE is "Backup and Candidate channel list" with Element ID=10.

Then, in step S87, CPE establishes IP connection by use of a mechanism such as DHCP, and then in step S101, time and date of an inner clock in CPE is adjusted by use of a mechanism such as NTP.

Then, in step S88, CPE acquires a setting file including operational parameters from BS by use of TFTP (Trivial File Transfer Protocol).

Then, in step S89, BS transmits a DSA-REQ message to cause CPE to set up a previously-provided service flow.

At last, in step S90, a neighboring network found by trying to receive preamble, or SCH or CBP packets transmitted from other BS is reported to BS. The processings similar to S75 and S90 are performed as IDRP (incumbent detection recovery protocol) in cooperation with BS also after the operation is started, and is reflected on the channel set in the DCD message.

Example 3

A scheme for evenly sharing channels, which has not been described according to Examples 1 and 2, will be described according to the present example. The structure and functions according to Example 1 will be employed.

BS 220 according to Example 1 explicitly includes a self-co-existence function unit 47. The self-co-existence function unit 47 additionally has a channel negotiation function in addition to co-existence by conventional frame contention or the like. Channel negotiation eliminates a situation in which BS which earlier starts operation occupies a plurality of channels and BS which is activated later cannot use any channel.

Four new messages including channel release request (CHN-REQ), channel release time notification (CHN-RSP), channel release time acknowledgement response (CHN-ACK) and channel release completion (CHN-CPLT) are defined in the MAC layer in order to realize the channel negotiation function.

Figure 15:
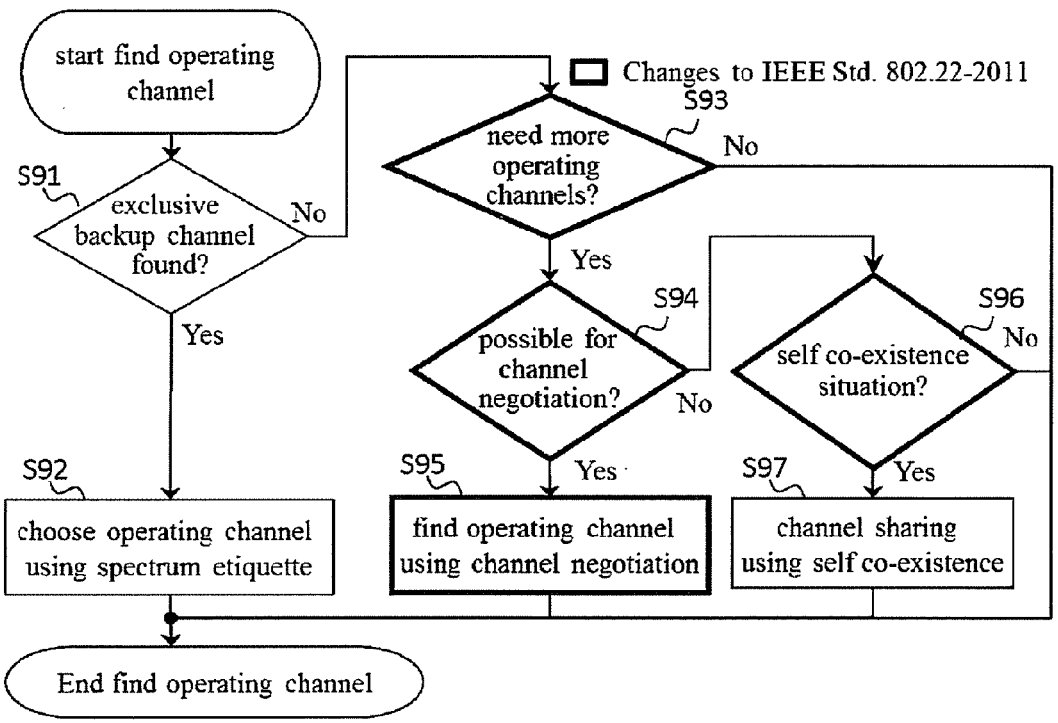
FIG. 15 is a flowchart of an operating channel discovery processing in BS 220 according to Example 3.

FIG. 15 is a flowchart of an operating channel discovery (determination) processing by BS 220 according to Example 3.

The flow starts after the use situations of channels of (a plurality of) adjacent cells are collected.

At first, in step S91, a channel (exclusive backup channel) which is a self-backup channel and is not designated as a backup channel in adjacent BS is searched with reference to the WSCH list.

When an exclusive backup channel is found, in step S92, the channel selection processing is performed according to a spectrum etiquette for which fairness is considered as before.

On the other hand, when an exclusive backup channel is not present, in step S93, a determination is made as to whether more operating channels are required depending on the degree of a satisfaction for service quality in a self-cell. The service satisfaction ratio SSR is defined at a rate of the number of $N_{sat}$ of satisfied CPE relative to the number $N_{CPE}$ of CPE in the cell, and satisfaction is defined depending on whether a value obtained by giving a weight W to traffic of CPE exceeds a transmission rate which BS can provide per CPE as in Equation 1.

$$SSR = N_{CPE}/N_{sat} \quad \text{(Equation 1)}$$

$$N_{sat} = \text{Countif}_i[R_i \cdot N_{OPE}/N_{CPE} > W_i \cdot \lambda_i] \quad \text{(Equation 2)}$$

where Countif[ ] indicates the number of CPE for which a conditional equation in brackets matches, i is an integer of 1 to $N_{CPE}$ indicating an index of CPE, $N_{OPE}$ indicates the number of operating channels, and R indicates a (maximum) transmission rate per channel. $R_i$ may be a constant not depending on CPE if a distance between BS and CPE, or the like is not considered.

When it is determined that SSR exceeds a predetermined value and an operating channel does not need to be found any more, the processing ends.

In step S94, a determination is made as to whether channel negotiation is possible based on the determination that more operating channels are required in step S92. The determination is made depending on whether there is found an adjacent cell, which is operating in multi-channel, and whose CSA (Cell Service Availability) value is larger than CSA of its self-cell, and is not reversed (not larger than a ceded adjacent cell) even if the cell cedes one channel to the self-cell. The CSA value is defined as the reciprocal of a sum of traffic processing times of each CPE in the cell as in Equation 3.

$$CSA = \{\Sigma_i[W_i \cdot \lambda_i/(R_i \cdot N_{OPE}/N_{CPE})]\}^{-1} \quad \text{(Equation 3)}$$

Therefore, in order to make the determination in step S93 or S94, SSR or CSA, or a value used for calculating the same needs to be exchanged between adjacent BSs previously or just in real time.

Then, in step S95, when it is determined that channel negotiation is possible, the channel negotiation is executed and a channel is acquired (ceded) from the destination.

On the other hand, when it is determined that channel negotiation is impossible, in step S96, a determination is made as to whether conventional self co-existence is to be achieved. That is, if $N_{OPE}=0$ is established and a SC mode (Self Co-existence mode) is executable, it is determined that self co-existence is to be achieved.

When the SC mode is executable, in step S97, self co-existence defined in the IEEE802.22 is executed. That is, when a channel which is a self-backup channel and an operating channel in an adjacent cell is arbitrarily selected, a right to operate a channel is acquired in units of frame by random algorithm called ODFC, and the channel is shared between cells in a time division manner, or when a downstream transmission/reception period (DS: Down Stream) and an upstream transmission/reception period (US: Up Stream) are synchronized between cells thereby to avoid an interference, channel sharing is realized.

Figure 16:
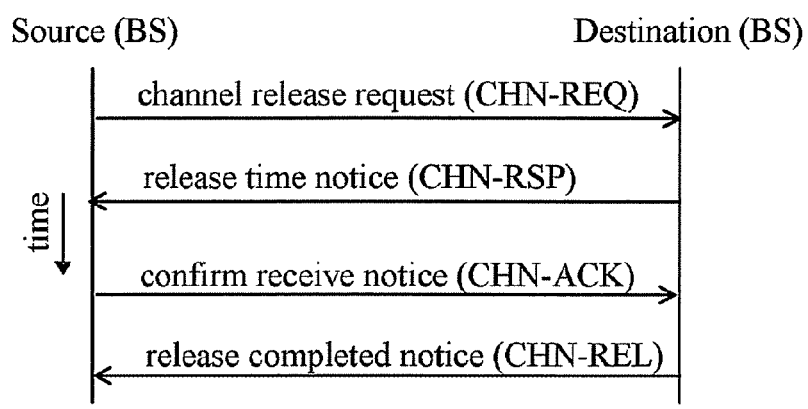
FIG. 16 is a flowchart of messages in channel negotiation in step S54 according to Example 3.

FIG. 16 is a flowchart of messages in channel negotiation in step S94. A channel release request (CHN-REQ), a channel release time notification (CHN-RSP), a channel release time acknowledgement response (CHN-ACK) and a channel release completion (CHN-CPLT) are sequentially exchanged. The messages are management messages, and are sent in SCW (Self Coexistence Window) rather than downstream burst.

A channel release request includes the CSA values of negotiation source and negotiation destination, and BS at the negotiation destination, which receives the channel release request, verifies it, and may return a channel release time notification (CHN-RSP) including an action code indicating denial depending on a verification result or the like.

An index such as SSR or CSA is used in step S92 or S93 according to the present example, but is not limited thereto. The reason why two indexes are used in the present example is as follows. That is, this is because loads given to BS may not appear quantitatively in SSR when a specific CPE traffic is so large, and if SSR is used in step S93, a traffic of the cell may not be allowed after channel release.

Fourth Example

In the present example, there will be described an operation when a plurality of CHUs are initialized at the same time, such as on activation in Examples 1 and 2, or an exemplary clarified format of a management message. Unless otherwise noted, the structure and functions according to Example 1 and 2 will be employed.

Figure 17:
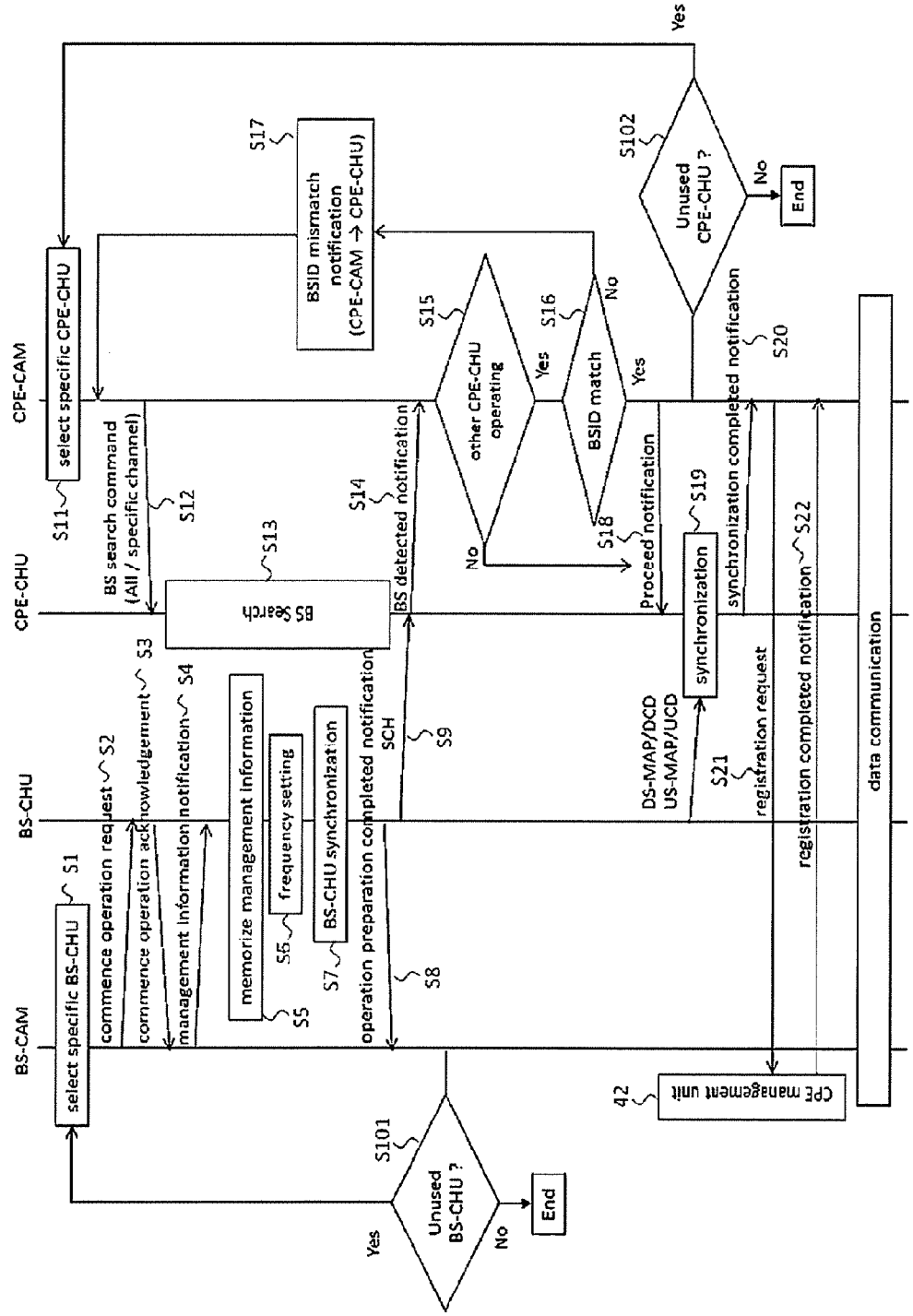
FIG. 17 is a flowchart of a channel addition processing between BS 2 and CPE 7 according to the fourth example.

FIG. 17 is a flowchart of a channel addition processing performed between BS 2 and CPE 7 according to the fourth example.

The flow in FIG. 17 is different from FIG. 8 according to Example 1 in that step S101 in which BS-CAM 41 determines whether unused BS-CHU remains is added after step S8, and step S102 in which CPE-CAM 81 determines whether unused CPE-CHU 71 remains is added after step S16.

Thereby, on the BS 2 side, when a process from the operation start request in step S2 to the operation start preparation completed notification in step S8 is completed, a determination in step S101 is made, and the processing can explicitly proceed to the operation start request (S2) for other unused BS-CHU.

On the CPE 7 side, when a process from the BS search instruction in step S12 to the continuation notification in step S18 is completed, a determination in step S102 is made, and the processing can explicitly proceed to the BS search instruction (S12) for other unused CPE-CHU.

Since only a reception operation such as BS search may be freely performed on unused CPE-CHUs, BS search instructions with different search ranges may be provided at the same time on a plurality of unused CPE-CHUs in step S12. A BS detection notification is sequentially made in step S14 from CPE-CHU which successfully performs BS detection, and CPE-CHU which does not successfully perform detection to the end adds a band not searched by the CPE-CHUs which successfully perform detection to the search range.

In step S104, BS-CHU 13a transmits the received aggregation information as a management message (CAM-AIF: Channel Allocation Manager-Aggregation InFormation) to CPE 7. The CAM-AIF message is preferably transmitted from all of BS-CHUs 13 (in a channel to be added now and other channel to be aggregated) in operation.

In step S105, CPE-CHU 71a in CPE 7 receiving the aggregation information transfers the aggregation information to CPE-CAM 81.

The aggregation information and management messages handled in steps S103 to 105 include parameters necessary for the CAM-AIF message illustrated in Table 6. Type number is essential only for management messages, but a management message may be obtained on transmission from BS-CAM 41, and BS-CHU 13a or CPE-CHU 71a in progress does not need to understand the management message.

TABLE 6

| CAM-AIF message format | | |
|---|---|---|
| Syntax | Size | Notes |
| CAM-AIF_Message_Format( ) { | | |
| Management Message Type = 41 | 8 bits | |
| Aggregation Information | 1 bit | 0: Aggregation on<br>1: Aggregation off |
| Maximum Aggregation Channels | 3 bits | The number of maximum aggregation channels allowed in CPE. |
| For (i=0;i < Maximum Aggregation Channels;i++){ | | List of the channel informations that are available for channel aggregation in CPE. |
| Channel Number [i] | 8 bits | |
| } | | |
| } | | |

Figure 18:
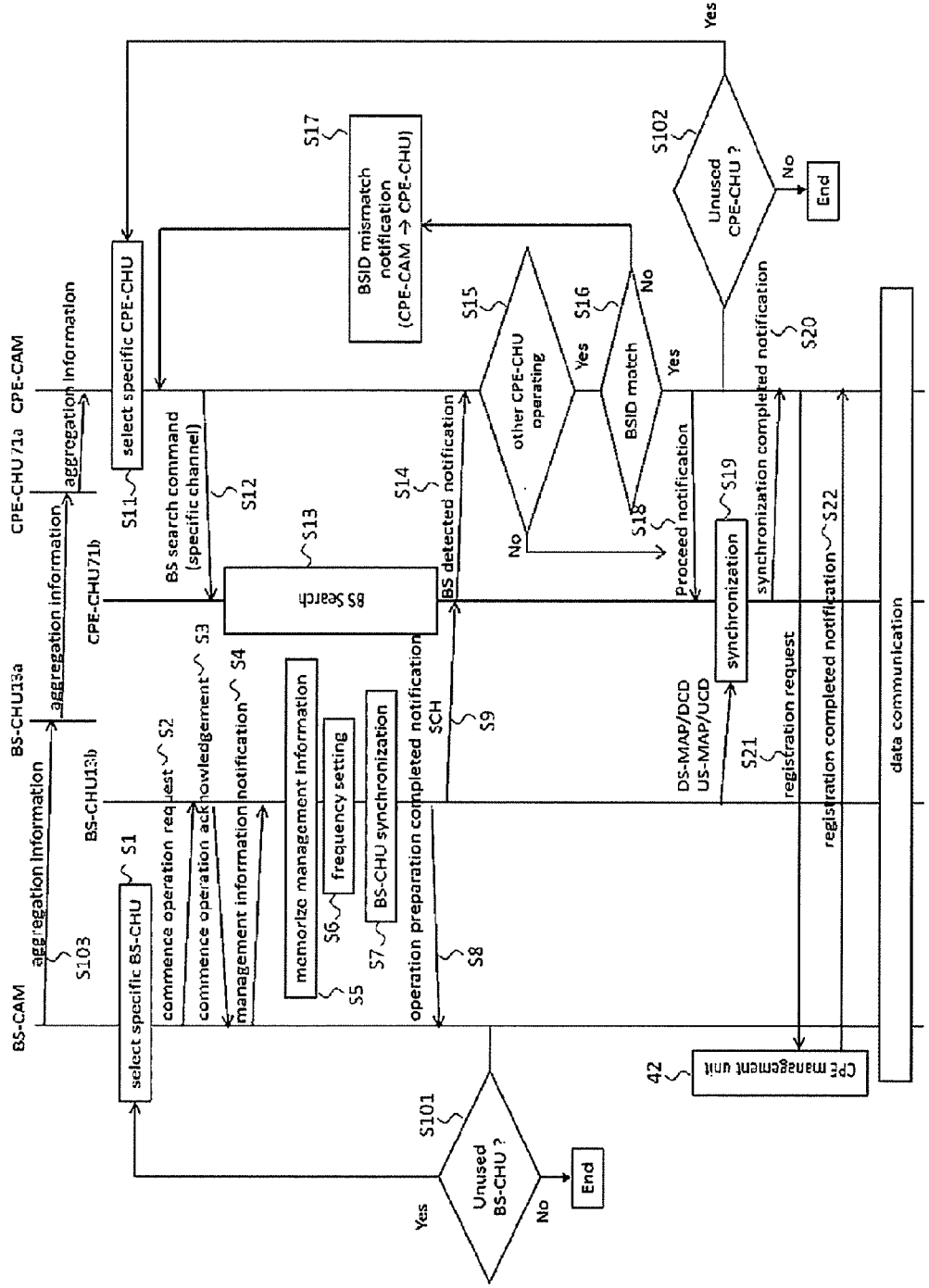
FIG. 18 is another flowchart of the channel addition processing between BS 2 and CPE 7 according to the fourth example.

FIG. 18 is another flowchart of the channel addition processing performed between BS 2 and CPE 7 according to the fourth example.

The flow in FIG. 18 illustrates the channel addition processing when at least one of BS-CHU 13 and CPE-CHU 71 is already operated and a management message is communicable therebetween. It is different from FIG. 17 in that steps (S103 to S105) of notifying aggregation information on multi-channel operation including channel number or the like from BS 2 to CPE 7 are provided before step S1.

At first, in step S103, BS-CAM 41 periodically transmits aggregation information to at least one BS-CHU 13a in operation when the multi-channel operation is started and during the operation. Aggregation information is desirably transmitted also after the channel addition, stop and switch processings are performed.

In Table 6, "Maximum Aggregation Channels" is defined to be equal to or less than the number of BS-CHUs 13 to be subject to multi-channel operation in BS 2. CPE 7 is prohibited from performing multi-channel operation beyond the number, and thus useless BS search is not performed. When a ratio between multi-channel operation CPE and normal operation CPE is to be controlled, lower "Maximum Aggregation Channels" may be set. "Channel Number[i]" is as many listed channel numbers (carrier index) or the like as "maximum Aggregation Channels."

The flow of a channel switch processing performed between BS 2 and CPE 7 according to the fourth example is basically the same as Example 1 illustrated in FIG. 9. The CH switch request in step S33 is a CAM-SWH message newly defined as indicated in Table 7, and the CH switch request in step S31 includes parameters necessary for CAM-SWH.

TABLE 7

| Syntax | Size | Notes |
|---|---|---|
| CAM-SWH_Message_Format( ) { | | |
| Management Message Type = 44 | 8 bits | |
| Transaction ID | 16 bits | |
| Confirmation Needed | 1 bit | 0: No confirmation needed<br>1: Confirmation needed |

TABLE 7-continued

| Syntax | Size | Notes |
|---|---|---|
| Switch Mode | 1 bit | 0: no restriction on transmission until the scheduled channel switch<br>1: addressed CPE shall transmit no further frames until the schedules channel switch. |
| Switch Count | 8 bits | The number of frames until the BS sending the switching operating channel message switches to the new operating channel. |
| Switch Channel Number | 8 bits | Specified destination for channel switch request. |
| } | | |

"Transaction ID" is directed for ignoring messages other than a first message when a plurality of messages with the same value arrive, and is generally incremented and used each time a message requiring Transaction ID is newly issued. "Switch Channel Number" is a channel number (carrier index) or the like at the switch destination. The message is assumed to be transmitted only from a channel at the switch source irrespective of whether "Aggregation Type" is "Diversity mode" or "Bulk transmission mode", and is not provided with information on the switch source. Though not recommended, when transmission is performed from a channel other than the channel at the switch source, CPE can specify the switch source in consideration of other information (such as continuity of Transaction ID). "Confirmation Needed" is a flag indicating whether to request CPE 7 to make a reception response (S37). When the flag is 1, a quot;CAM-SWH-ACK" message indicated in Table 8 is newly defined as a reception response responded by CPE 7 in S37. CAM-SWH-ACK has to be responded from only the channel at the switch source, too.

TABLE 8

CAM-SWH-ACK message format

| Syntax | Size | Notes |
|---|---|---|
| CAM-SWH-ACK_Message_Format( ) { | | |
| Management Message Type = 45 | 8 bits | |
| Transaction ID | 16 bits | |
| Confirmation Code | 8 bits | 7.7.24 |
| } | | |

"Confirmation Code" is defined by "7.2.24 Confirmation codes" in the 802.22. "Transaction ID" employs the same value as the CAM-SWH message.

The flow of a channel stop processing performed between BS 2 and CPE 7 according to the fourth example is basically the same as Example 1 illustrated in FIG. 10. A quot;CAM-STP" message indicated in Table 9 is newly defined as an operation stop request in step S53, and a quot;CAM-STP-ACK" message indicated in Table 10 is newly defined as an operation stop reception response in step S57. The messages are assumed to be transmitted and received only in a channel to be stopped similarly to channel switching, and information on a channel to be stopped is not particularly provided.

TABLE 9

CAM-STP message format

| Syntax | Size | Notes |
|---|---|---|
| CAM-STP_Message_Format( ) { | | |
| Management Message Type = 42 | 8 bits | |
| Transaction ID | 16 bits | |
| Confirmation Needed | 1 bit | 0: No confirmation needed<br>1: Confirmation needed |
| Stop Channel Number | 8 bits | Specified destination for channel stop operation request. |
| } | | |

TABLE 10

CAM-STP-ACK message format

| Syntax | Size | Notes |
|---|---|---|
| CAM-STP-ACK_Message_Format( ) { | | |
| Management Message Type = 43 | 8 bits | |
| Transaction ID | 16 bits | |
| Confirmation Code | 8 bits | 7.7.24 |
| } | | |

In the present example, the messages between BS and CPE, such as CH switch request in step S33, are assumed as management messages, but not limited to such broadcast transmission, unicast or multicast transmission toward only CPE necessary to be switched may be possible. Thereby, when a specific channel is intensively accessed, the channels to be allocated to CPE can be dispersed.

The scope of the present invention is not limited by the above-described examples for communication between BSs, and the processings performed in BS in the above examples may be intensively controlled by a server, manager or the like installed over the Internet. For example, channel negotiation may be performed via the Internet by encapsulating a management message, not limited to via wireless communication between BSs. Alternatively, a channel operation state in each BS may be monitored and controlled by a server or manager, and the equivalent advantages to the object of the present invention can be obtained even if each BS makes a channel request to the server.

The physical layers in CHU may be collectively configured, not being configured in a multisystem, and signals received in a plurality of channels by a digital signal processing in the physical layers may be subject to diversity combination.

REFERENCE SIGNS LIST 2, 120, 220: Base station (BS),
5: Internet,
6: DB server,
7, 170, 270: Terminal device (CPE),
13, 130: Wireless communication unit (BS-CHU: BS-CHannel transceiver Unit),
14, 72, 124: Channel unit control manager (CHU-M: CHU-Manager),
15, 16: Inter-unit I/F,
41: Channel allocation manager (BS-CAM: BS-Channel Allocation Manager),
42: CPE management unit,
43: Management information processing unit (MIB),
44: DB access control unit,
45: Communication data control unit,
46: Sensing control unit,
71: CPE-CHU,
81: Channel allocation manager (CPE-CAM),
125: Sensing unit,
131: MAC processing unit,
132: PHY processing unit,
133: Transmission/reception unit (Tx/Rx),
134: Management information processing unit,
135: Inter-unit I/F,
136: Antenna

The invention claimed is:

1. A multi-channel communication method for radio communication between a base station and a plurality of terminal stations by use of a plurality of channels in a white space, comprising:
   a first step where a channel allocation manager of a MAC layer of the base station determines or is notified from an upper layer of operating channels in the base station;
   a second step where the base station starting multi-channel operation transmits channel aggregation information for identifying the plurality of operating channels, as a management message, to the plurality of terminal stations via all channels currently in operation;
   a third step where the channel allocation manager of the base station determines a radio communication entity which is not currently used in the base station and an operating channel to be allocated to the radio communication entity;
   a fourth step where the channel allocation manager of the base station transmits, to the determined radio communication entity, an operation start request including a designation of the operating channel;
   a fifth step where, in the base station, the radio communication entity is notified of management information necessary to provide radio transmission and reception;
   a sixth step where the radio communication entity of the base station stores the notified management information, sets a carrier frequency according to the designation of the operating channel and synchronizes timing of a superframe and a frame with a reference time;
   a seventh step where the base station periodically transmits a radio frame including an identification of the base station in a plurality of operating channels;
   an eighth step where a channel allocation manager of at least one terminal station of the plurality of terminal stations issues a base station-search instruction to a radio communication entity included in the terminal station;
   a ninth step where, if the radio communication entity of the terminal station detects a radio signal from the base station and the identification of the base station, the channel allocation manager determines whether the detected base station is the same as a base station for a connection destination, by using the identification of the detected base station;
   a tenth step where the radio communication entity of the terminal station performs a synchronizing processing for a new operating channel with a frequency of the detected radio signal and notifies a completion of the synchronizing processing to the channel allocation manager of the terminal station;
   an eleventh step where, as triggered by the completion of the synchronizing processing, the terminal station transmits a registration request for the new operating channel to the base station;
   a twelfth step where, in response to the registration request, the base station notifies the terminal station a setting information for the terminal station; and
   a thirteenth step where the terminal station performs data communication with the base station by simultaneously using the plurality of operating channels including the new operating channel based on the setting information,
   wherein the thirteenth step comprises:
   a substep where the base station transmits, to the terminal station at least once per PHY frame on each of the plurality of operating channels, a MAC Protocol Data Unit (PDU) including an Aggregation Header for managing one or more data sequences bundled across the plurality of operating channels;
   a substep where the terminal station transmits, to the base station at least once per PHY frame on each of the plurality of operating channels, the MAC PDU including the Aggregation Header;
   a substep where the base station and the terminal station disperse a transmitting data in a dispersion mode into the plurality of operating channels and transmits the dispersed data; and
   a substep where the base station and the terminal station orders the data received via the plurality of operating channels in the dispersion mode.

2. The multi-channel communication method according to claim 1,
   wherein at least one of the plurality of terminals is a legacy terminal for operating only any one channel in the plurality of operating channels;
   wherein in the twelfth step the base station accepts the registration request on an arbitrary channel of the plurality of operating channels including the new operating channel; and
   wherein in the thirteenth step the terminal station during the multi-channel operation provides all MAC PDUs to be transmitted with the Aggregation Header and does not provide the MAC PDU transmitted by the legacy terminal with the Aggregation Header.

3. The multi-channel communication method according to claim 1, further comprising:

a fourteenth step where the channel allocation manager of the base station receives an available frequency channel list which is obtained by accessing an external database;

a fifteenth step where the channel allocation manager of the base station receives a sensing result performed by the base station for detecting an existing system; and a sixteenth step where the channel allocation manager of the base station receives the sensing result performed by the terminal station, wherein the first step is caused by one of fourteenth step through the sixteenth step whereby a change in available channels of the white space is found.

4. The multi-channel communication method according to claim 3, wherein the Aggregation Header is included in all MAC PDUs transmitted from the terminal station and the base station during the multi-channel operation; and the Aggregation Header has an Aggregation identification which is incremented by one each time the Aggregation identification is newly generated and returns to zero next to an upper limit of the Aggregation identification.

5. The multi-channel communication method according to claim 2, wherein the channel aggregation information transmitted in the second step includes a flag which indicates whether the channel aggregation is turned on or off, a maximum aggregation channel number determined by the base station, and listed channel numbers having an already operating channel and the new operating channel.

6. The multi-channel communication method according to claim 3, wherein the channel aggregation information transmitted in the second step includes a flag which indicates whether the channel aggregation is turned on or off, a maximum aggregation channel number determined by the base station, and listed channel numbers having an already operating channel and the new operating channel.

7. The multi-channel communication method according to claim 2, wherein, in the eighth step, the channel allocation manager of the terminal station transmits the base station search instruction for designating a search range based on the channel aggregation information; and wherein the terminal station transmits, to the base station, information element which indicates whether a capability of the multi-channel operation is provided for the registration request in at least a first operating channel.

8. The multi-channel communication method according to claim 2, further comprising:

a seventeenth step where, in the base station after the thirteenth step, the channel allocation manager allows the radio communication entity to transmit a management message for a channel switch request including a channel number of a switch destination and a designation of a switching timing from a channel of a switch source;

an eighteenth step where the terminal station transmits, to the base station, a management message for acknowledgement response to a reception of the management message for the channel switch request; and a nineteenth step where the radio communication entity of the base station and the radio communication entity of the terminal station respectively perform the channel switching at the designated switching timing.

9. The multi-channel communication method according to claim 2, further comprising:

a twentieth step where, in the base station after the thirteenth step, the channel allocation manager allows the radio communication entity to transmit, from the operating channel to be stopped, a management message for a channel stop request including a number of the operating channels to be stopped and a designation of a stopping timing;

a twenty-first step where the terminal station transmits to the base station a management message for acknowledgment response to a reception of the management message for the channel stop request; and a twenty-second step where the radio communication entity of the base station and the radio communication entity of the terminal station respectively stop the operating channel at the designated stopping timing, and release the stopped channel.

* * * * *